(12) United States Patent
Prakash et al.

(10) Patent No.: US 12,494,253 B2
(45) Date of Patent: Dec. 9, 2025

(54) GENERATION OF QUICK PASS WRITE BIASES IN A MEMORY DEVICE

(71) Applicant: Sandisk Technologies, Inc., Milpitas, CA (US)

(72) Inventors: Abhijith Prakash, Milpitas, CA (US); Xiang Yang, Santa Clara, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 65 days.

(21) Appl. No.: 18/223,358

(22) Filed: Jul. 18, 2023

(65) Prior Publication Data

US 2024/0304251 A1 Sep. 12, 2024

Related U.S. Application Data

(60) Provisional application No. 63/450,771, filed on Mar. 8, 2023.

(51) Int. Cl.
| | | |
|---|---|---|
| *G11C 16/10* | (2006.01) | |
| *G11C 16/08* | (2006.01) | |
| *G11C 16/30* | (2006.01) | |
| *G11C 16/34* | (2006.01) | |

(52) U.S. Cl.
CPC ......... *G11C 16/102* (2013.01); *G11C 16/08* (2013.01); *G11C 16/30* (2013.01); *G11C 16/3404* (2013.01)

(58) Field of Classification Search
CPC ....... G11C 16/102; G11C 16/08; G11C 16/30; G11C 16/3404; G11C 11/5628; G11C 16/0483; G11C 16/10
See application file for complete search history.

(56) References Cited

U.S. PATENT DOCUMENTS

| | | | |
|---|---|---|---|
| 8,705,293 B2 | 4/2014 | She et al. | |
| 9,013,928 B1 | 4/2015 | Dutta et al. | |
| 9,552,882 B2 | 1/2017 | Tseng et al. | |
| 10,984,877 B1 | 4/2021 | Kim et al. | |
| 2009/0323432 A1* | 12/2009 | Futatsuyama | G11C 16/3454 365/185.25 |
| 2012/0243329 A1* | 9/2012 | Nagashima | G11C 16/14 365/185.29 |
| 2022/0208287 A1 | 6/2022 | Petkar et al. | |

* cited by examiner

*Primary Examiner* — Xiaochun L Chen
(74) *Attorney, Agent, or Firm* — Dickinson Wright PLLC

(57) ABSTRACT

The memory device includes a quick pass write (QPW) voltage source and a transistor that can control the supply of a first QPW bias voltage to a plurality of bit lines. Control circuitry programs the memory cells of a selected word line in a plurality of program loops. For each memory cell in the selected word line, the control circuitry determines if the memory cell is within either a first or a second QPW zone. If the memory cell is in the second QPW zone, the control circuitry connects the QPW voltage source to the bit line that is in communication with that memory cell to supply the first QPW bias voltage to the bit line. In response to a determination that the memory cell is in the first QPW zone, the control circuitry controls the transistor to supply an average second QPW bias voltage to the bit line.

20 Claims, 27 Drawing Sheets

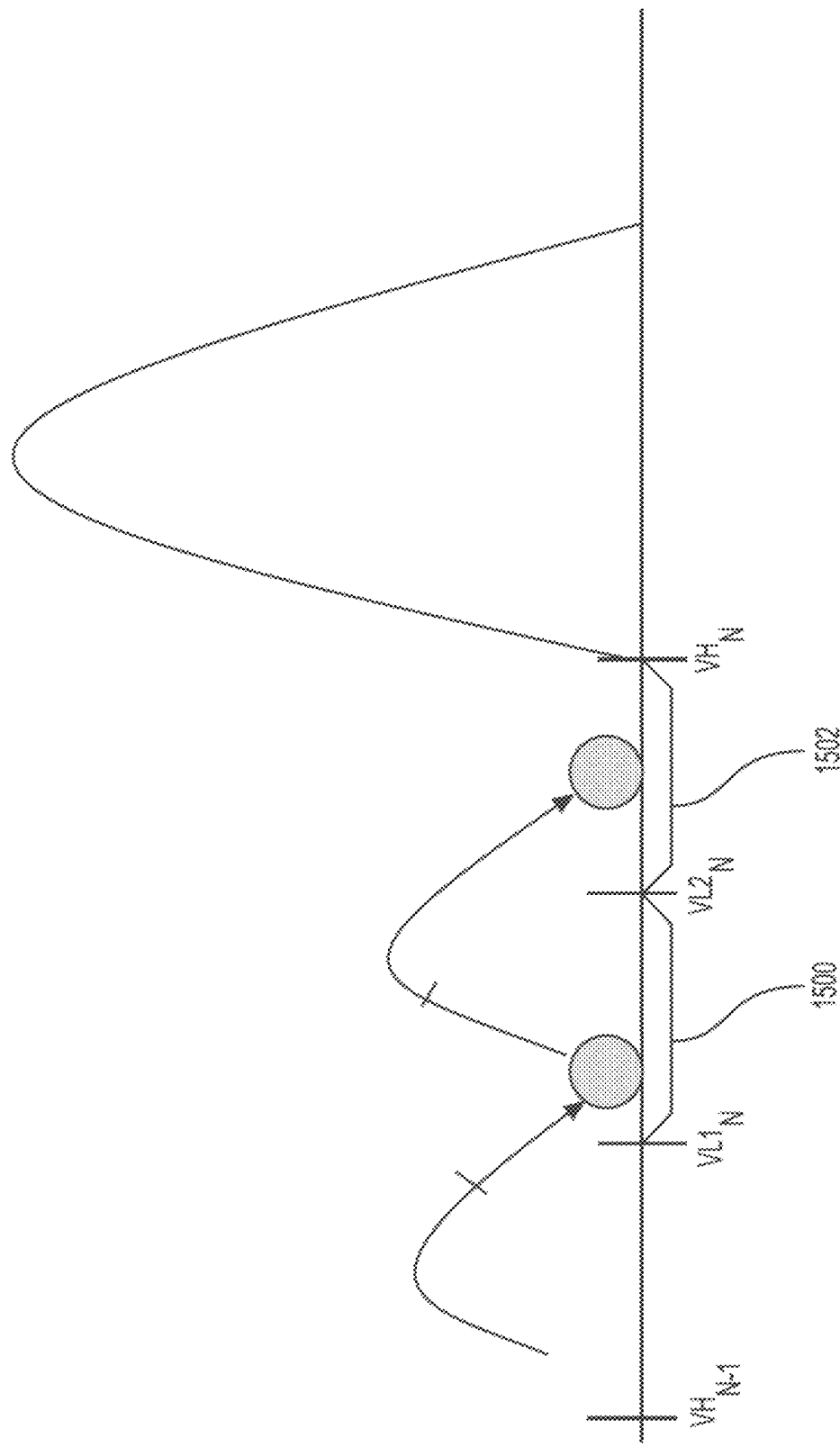

| TDLa | TDLb | FUNCTION | QPW=INVERT (TDLb) | QPW STATUS |
|---|---|---|---|---|
| 0 | 0 | BL_BIAS= VSS FOR ALL clks | 1 | NO QPW |
| 0 | 1 | BL_BIAS= VBLC_QPW FOR ALL clks | 0 | QPW_1 |
| 1 | 0 | BL_BIAS= VSS FOR n clks AND THEN INVERT TDLb (I.E., SET IT TO 1) | 1 | QPW_2 |
| 1 | 1 | BL_BIAS= VBLC_QPW FOR m clks AND THEN INVERT TDLb (I.E., SET IT TO 0) | 0 | |

*FIG. 20*

| TDLa | TDLb | FUNCTION | QPW TRANSISTOR | QPW STATUS |
|---|---|---|---|---|
| 0 | 0 | BL_BIAS= VSS FOR ALL clks | 1 | NO QPW |
| 0 | 1 | BL_BIAS= VBLC_QPW FOR ALL clks | 0 | VBLC_QPW_1 |
| 1 | 0 | BL_BIAS= VSS FOR m clks AND VSS FOR n clks | 0 FOR m clks AND 1 FOR n clks | VBLC_QPW_2 |
| 1 | 1 | BL_BIAS= VBLC_QPW FOR j clks AND VSS FOR k clks | 0 FOR j clks AND 1 FOR k clks | VBLC_QPW_3 |

*FIG. 23*

GENERATION OF QUICK PASS WRITE BIASES IN A MEMORY DEVICE

CROSS-REFERENCE TO RELATED APPLICATIONS

This application claims the benefit of U.S. Provisional Application No. 63/450,771, filed on Mar. 8, 2023. The entire disclosure of the application referenced above is incorporated herein by reference.

BACKGROUND

1. Field

The present disclosure is related to programming techniques for tightening the threshold voltage distributions of a plurality of programmed memory cells and thereby improve the reliability of the data programmed to those memory cells.

2. Related Art

Semiconductor memory is widely used in various electronic devices, such as cellular telephones, digital cameras, personal digital assistants, medical electronics, mobile computing devices, servers, solid state drives, non-mobile computing devices and other devices. Semiconductor memory may comprise non-volatile memory or volatile memory. A non-volatile memory allows information to be stored and retained even when the non-volatile memory is not connected to a source of power, e.g., a battery.

NAND is one type of non-volatile memory, and a NAND memory device typically includes a chip with a plurality of memory blocks, each of which includes an array of memory cells arranged in a plurality of word lines. A pair of example memory blocks 100, 110 are illustrated in a FIG. 1. In this example, the memory blocks 100, 110 have a two-dimensional configuration. A memory array in the chip can include many such blocks 100, 110. Each example block 100, 110 includes a number of NAND strings and respective bit lines, e.g., BL0, BL1, ... which are shared among the blocks. Each NAND string is connected at one end to a drain-side select gate (SGD), and the control gates of the drain select gates are connected via a common SGD line. The NAND strings are connected at their other end to a source-side select gate (SGS) which, in turn, is connected to a common source line 120. A large number of word lines varying between the technology nodes—for example, one hundred and twelve word lines (WL0-WL111) extend between the SGSs and the SGDs in a particular technology node. In some embodiments, the memory block may include more or fewer than one hundred and twelve word lines. For example, in some embodiments, a memory block includes one hundred and sixty-four word lines. In some cases, dummy word lines, which contain no user data, can also be used in the memory array adjacent to the select gate transistors. Such dummy word lines can shield the edge data word line from certain edge effects.

One type of non-volatile memory which may be provided in the memory array is a floating gate memory, such as of the type shown in FIGS. 2A and 2B. However, other types of non-volatile memory can also be used. As discussed in further detail below, in another example shown in FIGS. 3A and 3B, a charge-trapping memory cell uses a non-conductive dielectric material in place of a conductive floating gate to store charge in a non-volatile manner. A triple layer dielectric formed of silicon oxide, silicon nitride and silicon oxide ("ONO") is sandwiched between a conductive control gate and a surface of a semi-conductive substrate above the memory cell channel. The memory cell is programmed by injecting electrons from the cell channel into the nitride, where they are trapped and stored in a limited region. This stored charge then changes the threshold voltage Vt of a portion of the channel of the cell in a manner that is detectable. The memory cell is erased by injecting hot holes into the nitride. A similar cell can be provided in a split-gate configuration where a doped polysilicon gate extends over a portion of the memory cell channel to form a separate select transistor.

In another approach, NROM cells are used. Two bits, for example, are stored in each NROM cell, where an ONO dielectric layer extends across the channel between source and drain diffusions. The charge for one data bit is localized in the dielectric layer adjacent to the drain, and the charge for the other data bit is localized in the dielectric layer adjacent to the source. Multi-state data storage is obtained by separately reading binary states of the spatially separated charge storage regions within the dielectric. Other types of non-volatile memory are also known.

FIG. 2A illustrates a cross-sectional view of example floating gate memory cells 200, 210, 220 in NAND strings. In this Figure, a bit line or NAND string direction goes into the page, and a word line direction goes from left to right. As an example, word line 224 extends across NAND strings which include respective channel regions 206, 216 and 226. The memory cell 200 includes a control gate 202, a floating gate 204, a tunnel oxide layer 205 and the channel region 206. The memory cell 210 includes a control gate 212, a floating gate 214, a tunnel oxide layer 215 and the channel region 216. The memory cell 220 includes a control gate 222, a floating gate 221, a tunnel oxide layer 225 and the channel region 226. Each memory cell 200, 210, 220 is in a different respective NAND string. An inter-poly dielectric (IPD) layer 228 is also illustrated. The control gates 202, 212, 222 are portions of the word line. A cross-sectional view along contact line connector 229 is provided in FIG. 2B.

The control gate 202, 212, 222 wraps around the floating gate 204, 214, 221, increasing the surface contact area between the control gate 202, 212, 222 and floating gate 204, 214, 221. This results in higher IPD capacitance, leading to a higher coupling ratio which makes programming and erase easier. However, as NAND memory devices are scaled down, the spacing between neighboring cells 200, 210, 220 becomes smaller so there is almost no space for the control gate 202, 212, 222 and the IPD layer 228 between two adjacent floating gates 202, 212, 222.

As an alternative, as shown in FIGS. 3A and 3B, the flat or planar memory cell 300, 310, 320 has been developed in which the control gate 302, 312, 322 is flat or planar; that is, it does not wrap around the floating gate and its only contact with the IPD layer 328 is from above it. In this case, there is no advantage in having a tall floating gate. Instead, the floating gate is made much thinner. Further, the floating gate can be used to store charge, or a thin charge trap layer can be used to trap charge. This approach can avoid the issue of ballistic electron transport, where an electron can travel through the floating gate after tunneling through the tunnel oxide during programming.

FIG. 3A depicts a cross-sectional view of example charge-trapping memory cells 300, 310, 320 in NAND strings. The view is in a word line direction of memory cells 300, 310, 320 comprising a flat control gate and charge-trapping regions as a two-dimensional example of memory cells 300, 310, 320 in the memory cell array 126. Charge-trapping memory can be used in NOR and NAND flash memory device. This technology uses an insulator such as an SiN film to store electrons, in contrast to a floating-gate MOSFET technology which uses a conductor such as doped polycrystalline silicon to store electrons. As an example, a word line 324 extends across NAND strings which include respective channel regions 306, 316, 326. Portions of the word line provide control gates 302, 312, 322. Below the word line is an IPD layer 328, charge-trapping layers 304, 314, 321, polysilicon layers 305, 315, 325, and tunneling layers 309, 307, 308. Each charge-trapping layer 304, 314, 321 extends continuously in a respective NAND string. The flat configuration of the control gate can be made thinner than a floating gate. Additionally, the memory cells can be placed closer together.

FIG. 3B illustrates a cross-sectional view of the structure of FIG. 3A along contact line connector 329. The NAND string 330 includes an SGS transistor 331, example memory cells 300, 333, . . . 335, and an SGD transistor 336. Passageways in the IPD layer 328 in the SGS and SGD transistors 331, 336 allow the control gate layers 302 and floating gate layers to communicate. The control gate 302 and floating gate layers may be polysilicon and the tunnel oxide layer may be silicon oxide, for instance. The IPD layer 328 can be a stack of nitrides (N) and oxides (O) such as in a N—O—N—O—N configuration.

The NAND string may be formed on a substrate which comprises a p-type substrate region 355, an n-type well 356 and a p-type well 357. N-type source/drain diffusion regions sd1, sd2, sd3, sd4, sd5, sd6 and sd7 are formed in the p-type well. A channel voltage, Vch, may be applied directly to the channel region of the substrate.

FIG. 4 illustrates an example block diagram of a sense block SB1 in a memory chip. In one approach, a sense block comprises multiple sense circuits. Each sense circuit is associated with data latches. For example, the example sense circuits 450a, 451a, 452a, and 453a are associated with the data latches 450b, 451b, 452b, and 453b, respectively. In one approach, different subsets of bit lines can be sensed using different respective sense blocks. This allows the processing load which is associated with the sense circuits to be divided up and handled by a respective processor in each sense block. For example, a sense circuit controller 460 in SB1 can communicate with the set of sense circuits and latches. The sense circuit controller 460 may include a pre-charge circuit 461 which provides a voltage to each sense circuit for setting a pre-charge voltage. In one possible approach, the voltage is provided to each sense circuit independently, e.g., via the data bus and a local bus. In another possible approach, a common voltage is provided to each sense circuit concurrently. The sense circuit controller 460 may also include a pre-charge circuit 461, a memory 462 and a processor 463. The memory 462 may store code which is executable by the processor to perform the functions described herein. These functions can include reading the latches 450b, 451b, 452b, 453b which are associated with the sense circuits 450a, 451a, 452a, 453a, setting bit values in the latches and providing voltages for setting pre-charge levels in sense nodes of the sense circuits 450a, 451a, 452a, 453a. Further example details of the sense circuit controller 460 and the sense circuits 450a, 451a, 452a, 453a are provided below.

In some embodiments, a memory cell may include a flag register that includes a set of latches storing flag bits. In some embodiments, a quantity of flag registers may correspond to a quantity of data states. In some embodiments, one or more flag registers may be used to control a type of verification technique used when verifying memory cells. In some embodiments, a flag bit's output may modify associated logic of the device, e.g., address decoding circuitry, such that a specified block of cells is selected. A bulk operation (e.g., an erase operation, etc.) may be carried out using the flags set in the flag register, or a combination of the flag register with the address register, as in implied addressing, or alternatively by straight addressing with the address register alone.

FIG. 5A is a perspective view of a set of blocks 500 in an example three-dimensional configuration. On the substrate are example blocks BLK0, BLK1, BLK2, BLK3 of memory cells (storage elements) and a peripheral area 504 with circuitry for use by the blocks BLK0, BLK1, BLK2, BLK3. For example, the circuitry can include voltage drivers 505 which can be connected to control gate layers of the blocks BLK0, BLK1, BLK2, BLK3. In one approach, control gate layers at a common height in the blocks BLK0, BLK1, BLK2, BLK3 are commonly driven. The substrate 501 can also carry circuitry under the blocks BLK0, BLK1, BLK2, BLK3, along with one or more lower metal layers which are patterned in conductive paths to carry signals of the circuitry. The blocks BLK0, BLK1, BLK2, BLK3 are formed in an intermediate region 502 of the memory device. In an upper region 503 of the memory device, one or more upper metal layers are patterned in conductive paths to carry signals of the circuitry. Each block BLK0, BLK1, BLK2, BLK3 comprises a stacked area of memory cells, where alternating levels of the stack represent word lines. In one possible approach, each block BLK0, BLK1, BLK2, BLK3 has opposing tiered sides from which vertical contacts extend upward to an upper metal layer to form connections to conductive paths. While four blocks BLK0, BLK1, BLK2, BLK3 are illustrated as an example, two or more blocks can be used, extending in the x- and/or y-directions.

In one possible approach, the length of the plane, in the x-direction, represents a direction in which signal paths to word lines extend in the one or more upper metal layers (a word line or SGD line direction), and the width of the plane, in the y-direction, represents a direction in which signal paths to bit lines extend in the one or more upper metal layers (a bit line direction). The z-direction represents a height of the memory device.

FIG. 5B illustrates an example cross-sectional view of a portion of one of the blocks BLK0, BLK1, BLK2, BLK3 of FIG. 5A. The block comprises a stack 510 of alternating conductive and dielectric layers. In this example, the conductive layers comprise two SGD layers, two SGS layers and four dummy word line layers DWLD0, DWLD1, DWLS0 and DWLS1, in addition to data word line layers (word lines) WL0-WL111. The dielectric layers are labelled as DL0-DL116. Further, regions of the stack 510 which comprise NAND strings NS1 and NS2 are illustrated. Each NAND string encompasses a memory hole 518, 519 which is filled with materials which form memory cells adjacent to the word lines. A region 522 of the stack 510 is shown in greater detail in FIG. 5D and is discussed in further detail below.

The stack 510 includes a substrate 511, an insulating film 512 on the substrate 511, and a portion of a source line SL. NS1 has a source-end 513 at a bottom 514 of the stack and a drain-end 515 at a top 516 of the stack 510. Contact line connectors (e.g., slits, such as metal-filled slits) 517, 520 may be provided periodically across the stack 510 as interconnects which extend through the stack 510, such as to connect the source line to a particular contact line above the stack 510. The contact line connectors 517, 520 may be used during the formation of the word lines and subsequently filled with metal. A portion of a bit line BL0 is also illustrated. A conductive via 521 connects the drain-end 515 to BL0.

FIG. 5C illustrates a plot of memory hole diameter in the stack of FIG. 5B. The vertical axis is aligned with the stack of FIG. 5B and illustrates a width (wMH), e.g., diameter, of the memory holes 518 and 519. The word line layers WL0-WL111 of FIG. 5A are repeated as an example and are at respective heights z0-z111 in the stack. In such a memory device, the memory holes which are etched through the stack have a very high aspect ratio. For example, a depth-to-diameter ratio of about 25-30 is common. The memory holes may have a circular cross-section. Due to the etching process, the memory hole width can vary along the length of the hole. Typically, the diameter becomes progressively smaller from the top to the bottom of the memory hole. That is, the memory holes are tapered, narrowing at the bottom of the stack. In some cases, a slight narrowing occurs at the top of the hole near the select gate so that the diameter becomes slightly wider before becoming progressively smaller from the top to the bottom of the memory hole.

FIG. 5D illustrates a close-up view of the region 522 of the stack 510 of FIG. 5B. Memory cells are formed at the different levels of the stack at the intersection of a word line layer and a memory hole. In this example, SGD transistors 580, 581 are provided above dummy memory cells 582, 583 and a data memory cell MC. A number of layers can be deposited along the sidewall (SW) of the memory hole 530 and/or within each word line layer, e.g., using atomic layer deposition. For example, each column (e.g., the pillar which is formed by the materials within a memory hole 530) can include a charge-trapping layer or film 563 such as SiN or other nitride, a tunneling layer 564, a polysilicon body or channel 565, and a dielectric core 566. A word line layer can include a blocking oxide/block high-k material 560, a metal barrier 561, and a conductive metal 562 such as Tungsten as a control gate. For example, control gates 590, 591, 592, 593, and 594 are provided. In this example, all of the layers except the metal are provided in the memory hole 530. In other approaches, some of the layers can be in the control gate layer. Additional pillars are similarly formed in the different memory holes. A pillar can form a columnar active area (AA) of a NAND string.

When a memory cell is programmed, electrons are stored in a portion of the charge-trapping layer which is associated with the memory cell. These electrons are drawn into the charge-trapping layer from the channel, and through the tunneling layer. The Vt of a memory cell is increased in proportion to the amount of stored charge. During an erase operation, the electrons return to the channel.

Each of the memory holes 530 can be filled with a plurality of annular layers comprising a blocking oxide layer, a charge trapping layer 563, a tunneling layer 564 and a channel layer. A core region of each of the memory holes 530 is filled with a body material, and the plurality of annular layers are between the core region and the word line in each of the memory holes 530.

The NAND string can be considered to have a floating body channel because the length of the channel is not formed on a substrate. Further, the NAND string is provided by a plurality of word line layers above one another in a stack, and separated from one another by dielectric layers.

FIG. 6A illustrates a top view of an example word line layer WL0 of the stack 510 of FIG. 5B. As mentioned, a three-dimensional memory device can comprise a stack of alternating conductive and dielectric layers. The conductive layers provide the control gates of the SG transistors and memory cells. The layers used for the SG transistors are SG layers and the layers used for the memory cells are word line layers. Further, memory holes are formed in the stack and filled with a charge-trapping material and a channel material. As a result, a vertical NAND string is formed. Source lines are connected to the NAND strings below the stack and bit lines are connected to the NAND strings above the stack.

A block BLK in a three-dimensional memory device can be divided into sub-blocks, where each sub-block comprises a NAND string group which has a common SGD control line. For example, see the SGD lines/control gates SGD0, SGD1, SGD2 and SGD3 in the sub-blocks SBa, SBb, SBc and SBd, respectively. Further, a word line layer in a block can be divided into regions. Each region is in a respective sub-block and can extend between contact line connectors (e.g., slits) which are formed periodically in the stack to process the word line layers during the fabrication process of the memory device. This processing can include replacing a sacrificial material of the word line layers with metal. Generally, the distance between contact line connectors should be relatively small to account for a limit in the distance that an etchant can travel laterally to remove the sacrificial material, and that the metal can travel to fill a void which is created by the removal of the sacrificial material. For example, the distance between contact line connectors may allow for a few rows of memory holes between adjacent contact line connectors. The layout of the memory holes and contact line connectors should also account for a limit in the number of bit lines which can extend across the region while each bit line is connected to a different memory cell. After processing the word line layers, the contact line connectors can optionally be filed with metal to provide an interconnect through the stack.

In this example, there are four rows of memory holes between adjacent contact line connectors. A row here is a group of memory holes which are aligned in the x-direction. Moreover, the rows of memory holes are in a staggered pattern to increase the density of the memory holes. The word line layer or word line is divided into regions WL0a, WL0b, WL0c and WL0d which are each connected by a contact line 613. The last region of a word line layer in a block can be connected to a first region of a word line layer in a next block, in one approach. The contact line 613, in turn, is connected to a voltage driver for the word line layer. The region WL0a has example memory holes 610, 611 along a contact line 612. The region WL0b has example memory holes 614, 615. The region WL0c has example memory holes 616, 617. The region WL0d has example memory holes 618, 619. The memory holes are also shown in FIG. 6B. Each memory hole can be part of a respective NAND string. For example, the memory holes 610, 614, 616 and 618 can be part of NAND strings NS0_SBa, NS1_SBb, NS2_SBc, NS3_SBd, and NS4_SBe, respectively.

Each circle represents the cross-section of a memory hole at a word line layer or SG layer. Example circles shown with dashed lines represent memory cells which are provided by the materials in the memory hole and by the adjacent word line layer. For example, memory cells 620, 621 are in WL0a, memory cells 624, 625 are in WL0b, memory cells 626, 627 are in WL0c, and memory cells 628, 629 are in WL0d. These memory cells are at a common height in the stack.

Contact line connectors (e.g., slits, such as metal-filled slits) 601, 602, 603, 604 may be located between and adjacent to the edges of the regions WL0a-WL0d. The contact line connectors 601, 602, 603, 604 provide a conductive path from the bottom of the stack to the top of the stack. For example, a source line at the bottom of the stack may be connected to a conductive line above the stack, where the conductive line is connected to a voltage driver in a peripheral region of the memory device.

FIG. 6B illustrates a top view of an example top dielectric layer DL116 of the stack of FIG. 5B. The dielectric layer is divided into regions DL116a, DL116b, DL116c and DL116d. Each region can be connected to a respective voltage driver. This allows a set of memory cells in one region of a word line layer being programmed concurrently, with each memory cell being in a respective NAND string which is connected to a respective bit line. A voltage can be set on each bit line to allow or inhibit programming during each program voltage.

The region DL116a has the example memory holes 610, 611 along a contact line 612, which is coincident with a bit line BL0. A number of bit lines extend above the memory holes and are connected to the memory holes as indicated by the "X" symbols. BL0 is connected to a set of memory holes which includes the memory holes 611, 615, 617, 619. Another example bit line BL1 is connected to a set of memory holes which includes the memory holes 610, 614, 616, 618. The contact line connectors (e.g., slits, such as metal-filled slits) 601, 602, 603, 604 from FIG. 6A are also illustrated, as they extend vertically through the stack. The bit lines can be numbered in a sequence BL0-BL23 across the DL116 layer in the x-direction.

Different subsets of bit lines are connected to memory cells in different rows. For example, BL0, BL4, BL8, BL12, BL16, BL20 are connected to memory cells in a first row of cells at the right-hand edge of each region. BL2, BL6, BL10, BL14, BL18, BL22 are connected to memory cells in an adjacent row of cells, adjacent to the first row at the right-hand edge. BL3, BL7, BL11, BL15, BL19, BL23 are connected to memory cells in a first row of cells at the left-hand edge of each region. BL1, BL5, BL9, BL13, BL17, BL21 are connected to memory cells in an adjacent row of memory cells, adjacent to the first row at the left-hand edge.

The memory cells of the memory blocks can be programmed to retain one or more bits of data in multiple data states, each of which is associated with a respective and defined threshold voltage Vt range. For example, FIG. 7 depicts a threshold voltage Vt distribution of a group of memory cells programmed according to a one bit per memory cell (SLC) storage scheme. In the SLC storage scheme, there are two total data states, including the erased state (Er) and a single programmed data state (S1). FIG. 8 illustrates the threshold voltage Vt distribution of a three bits per cell (TLC) storage scheme that includes eight total data states, namely the erased state (Er) and seven programmed data states (S1, S2, S3, S4, S5, S6, and S7). Each programmed data state (S1-S7) is associated with a respective verify voltage (Vv1-Vv7), which is employed during a verify portion of a programming operation as discussed in further detail below. FIG. 9 depicts a threshold voltage Vt distribution of a four bits per cell (QLC) storage scheme that includes sixteen total data states, namely the erased state (Er) and fifteen programmed data states (S1-S15). Other storage schemes are also available, such as two bits per memory cell (MLC) with four data states or five bits per memory cell (PLC) with thirty-two data states.

SUMMARY

One aspect of the present disclosure is related to a method of programming a memory device. The method includes the step of preparing a memory block that includes a plurality of memory cells that are in electrical communication with respective bit lines and are arranged in a plurality of word lines. The memory device also includes a quick pass write (QPW) voltage source and at least one transistor that is configured to control the supply of a first QPW bias voltage from the QPW voltage source to the bit lines. The method continues with the step of programming the memory cells of a selected word line of the plurality of word lines to a plurality of data states in a plurality of program loops. For each memory cell in the selected word line, the program loops include the step of determining if the memory cell has a threshold voltage that is within a first QPW zone or is within a second QPW zone. In response to a determination that the memory cell is in the second QPW zone, the method proceeds with the step of connecting the QPW voltage source to the bit line that is in communication with that memory cell to supply the first QPW bias voltage to the bit line. In response to a determination that the memory cell is in the first QPW zone, the method proceeds with the step of controlling the at least one transistor to supply an average second QPW bias voltage to the bit line. The second QPW bias voltage is less than the first QPW bias voltage.

According to another aspect of the present disclosure, each program loop further includes the step of applying a programming pulse to the selected word line.

According to yet another aspect of the present disclosure, the at least one transistor includes a QPW transistor, and the step of controlling the at least one transistor to supply the average second QPW bias voltage to the bit line includes modulating the QPW transistor.

According to still another aspect of the present disclosure, the program loops further include, for each memory cell in the selected word line, the step of applying a very low VSS voltage to the bit line in response to a determination that the memory cell has a threshold voltage that is less than the first QPW zone.

According to a further aspect of the present disclosure, the program loops further include, for each memory cell in the selected word line, the step of applying an inhibit voltage to the bit line in response to a determination that the memory cell has a threshold voltage that is above the second QPW zone.

According to yet a further aspect of the present disclosure, the step of determining if the memory cell has a threshold voltage that is within the first QPW zone or is within the second QPW zone further includes determining if the memory cell has a threshold voltage that is within a third QPW zone that is different than the first and second QPW zones. The program loops further include, for each memory cell in the selected word line, the step of modulating the QPW transistor in a manner that supplies an average third QPW bias voltage to the bit line, the average third QPW voltage being different than the average second QPW bias voltage in response to a determination that the memory cell has a threshold voltage that is in the third QPW zone.

According to still a further aspect of the present disclosure, the memory block further includes a VSS voltage source that supplies a VSS voltage that is less than the first QPW bias voltage. The QPW transistor is located electrically between the VSS voltage source and one of the bit lines.

According to another aspect of the present disclosure, between program loops, a programming voltage of the programming pulse is increased.

Another aspect of the present disclosure is related to a memory device that includes a memory block with a plurality of memory cells that are in electrical communication with respective bit lines and are arranged in a plurality of word lines. The memory device also includes a quick pass write (QPW) voltage source and at least one transistor that can control the supply of a first QPW bias voltage from the QPW voltage source to the bit lines. The memory device further includes control circuitry that is configured to program the memory cells of a selected word line of the plurality of word lines to a plurality of data states in a plurality of program loops. For each memory cell in the selected word line, the control circuitry is configured to determine if the memory cell has a threshold voltage that is within a first QPW zone or is within a second QPW zone. In response to a determination that the memory cell is in the second QPW zone, the control circuitry is configured to connect the QPW voltage source to the bit line that is in communication with that memory cell to supply the first QPW bias voltage to the bit line. In response to a determination that the memory cell is in the first QPW zone, the control circuitry is configured to control the at least one transistor to supply an average second QPW bias voltage to the bit line. The second QPW bias voltage is less than the first QPW bias voltage.

According to another aspect of the present disclosure, during each program loop, the control circuitry is further configured to apply a programming pulse to the selected word line.

According to yet another aspect of the present disclosure, the at least one transistor includes a QPW transistor, and the control circuitry is configured to modulate the QPW transistor to supply the average second QPW bias voltage to the bit line.

According to still another aspect of the present disclosure, during each of the program loops, for each memory cell of the selected word line, the control circuitry is further configured to apply a very low VSS voltage to the bit line in response to a determination that the memory cell has a threshold voltage that is less than the first QPW zone.

According to a further aspect of the present disclosure, during each of the program loops, for each memory cell in the selected word line, the control circuitry is further configured to apply an inhibit voltage to the bit line in response to a determination that the memory cell has a threshold voltage that is above the second QPW zone.

According to yet a further aspect of the present disclosure, for each memory cell of the selected word line, the control circuitry is further configured to determine if the memory cell has a threshold voltage that is within a third QPW zone that is different than the first and second QPW zones. During each of the program loops, for each memory cell in the selected word line, the control circuitry is further configured to modulate the QPW transistor in a manner that supplies an average third QPW bias voltage to the bit line in response to a determination that the memory cell has a threshold voltage that is in the third QPW zone. The average third QPW voltage is different than the average second QPW bias voltage.

According to still a further aspect of the present disclosure, the memory block further includes a VSS voltage source that supplies a VSS voltage that is less than the first QPW bias voltage. The QPW transistor is located electrically between the VSS voltage source and one of the bit lines.

According to another aspect of the present disclosure, between program loops, the control circuitry is configured to increase a programming voltage of the programming pulse.

Yet another aspect of the present disclosure is related to an apparatus that includes a memory block with a plurality of memory cells that are in electrical communication with respective bit lines and are arranged in a plurality of word lines. The apparatus also includes a quick pass write (QPW) voltage source and a QPW transistor that can control the supply of a first QPW bias voltage from the QPW voltage source to the bit lines. The apparatus further includes a programming means for programming the memory cells of the plurality of word lines. During programming of the memory cells of a selected word line of the plurality of word lines, the programming means is configured to determine if a selected memory cell of the selected word line has a threshold voltage that is below a first QPW zone, within the first QPW zone, within a second QPW zone, or above the second QPW zone. In response to a determination that the selected memory cell has a threshold voltage that is below the first QPW zone, the programming means is further configured to apply a VSS voltage to the bit line that is in communication with the selected memory cell. In response to a determination that the selected memory cell has a threshold voltage that is in the first QPW zone, the programming means is configured to modulate the QPW transistor to apply a second QPW bias voltage to the bit line that is in communication with the selected memory cell. In response to a determination that the selected memory cell has a threshold voltage that is in the second QPW zone, the programming means is further configured to apply the first QPW bias voltage to the bit line that is in communication with the selected memory cell. In response to a determination that the selected memory cell has a threshold voltage that is above the second QPW zone, the programming means is further configured to apply an inhibit voltage to the bit line that is in communication with the selected memory cell.

According to another aspect of the present disclosure, during each program loop, the programming means is further configured to apply a programming pulse to the selected word line.

According to yet another aspect of the present disclosure, the memory block further includes a VSS voltage source that supplies the VSS voltage. The QPW transistor is located electrically between the VSS voltage source and one of the bit lines.

According to still another aspect of the present disclosure, between program loops, the programming means is configured to increase a programming voltage of the programming pulse.

BRIEF DESCRIPTION OF THE DRAWINGS

A more detailed description is set forth below with reference to example embodiments depicted in the appended figures. Understanding that these figures depict only example embodiments of the disclosure and are, therefore, not to be considered limiting of its scope. The disclosure is described and explained with added specificity and detail through the use of the accompanying drawings in which:

FIG. 15 is a plot of the threshold voltage of a memory cell following a plurality of program loops where there are two QPW zones;

FIG. 20 is a table coupling two data latches, the status of the QPW transistor, and the resulting QPW voltages according to a first example embodiment of the present disclosure;

FIG. 23 is a table coupling two data latches, the status of the QPW transistor, and the resulting QPW voltages according to a second example embodiment of the present disclosure;

DESCRIPTION OF THE ENABLING EMBODIMENTS

As discussed in further detail below, one aspect of the present disclosure is related to a programming technique which utilizes a two or more zone quick pass write (QPW) operation to effectively slow programming when the threshold voltage Vt of a memory cell is close to a verify voltage of an intended programmed data state for that memory cell. This is accomplished with only a single QPW voltage source, i.e., the multiple voltage pumps and regulators found on other known memory devices that utilize dual-zone QPW programming are not necessary. During programming, if the threshold voltage Vt of a memory cell being programmed is detected as falling within one QPW zone adjacent a verify voltage Vv, then the QPW voltage source is directly applied to a bit line coupled with that memory cell during a following programming pulse to apply a first QPW bias voltage on that bit line and greatly slow programming of the memory cell. If the memory cell being programmed is detected as being in another QPW zone that is further from the verify voltage Vv, then a QPW transistor is modulated between being on and off to thereby effectively apply a second QPW bias voltage on the bit line to slow programming of the memory cell but not by as much as the first QPW bias voltage slows programming. These programming techniques improve threshold voltage Vt margin by more accurately programming the memory cells to their respective intended data states. The improved Vt margin improves performance and reliability and are discussed in further detail below.

Figures 10A, 10B:
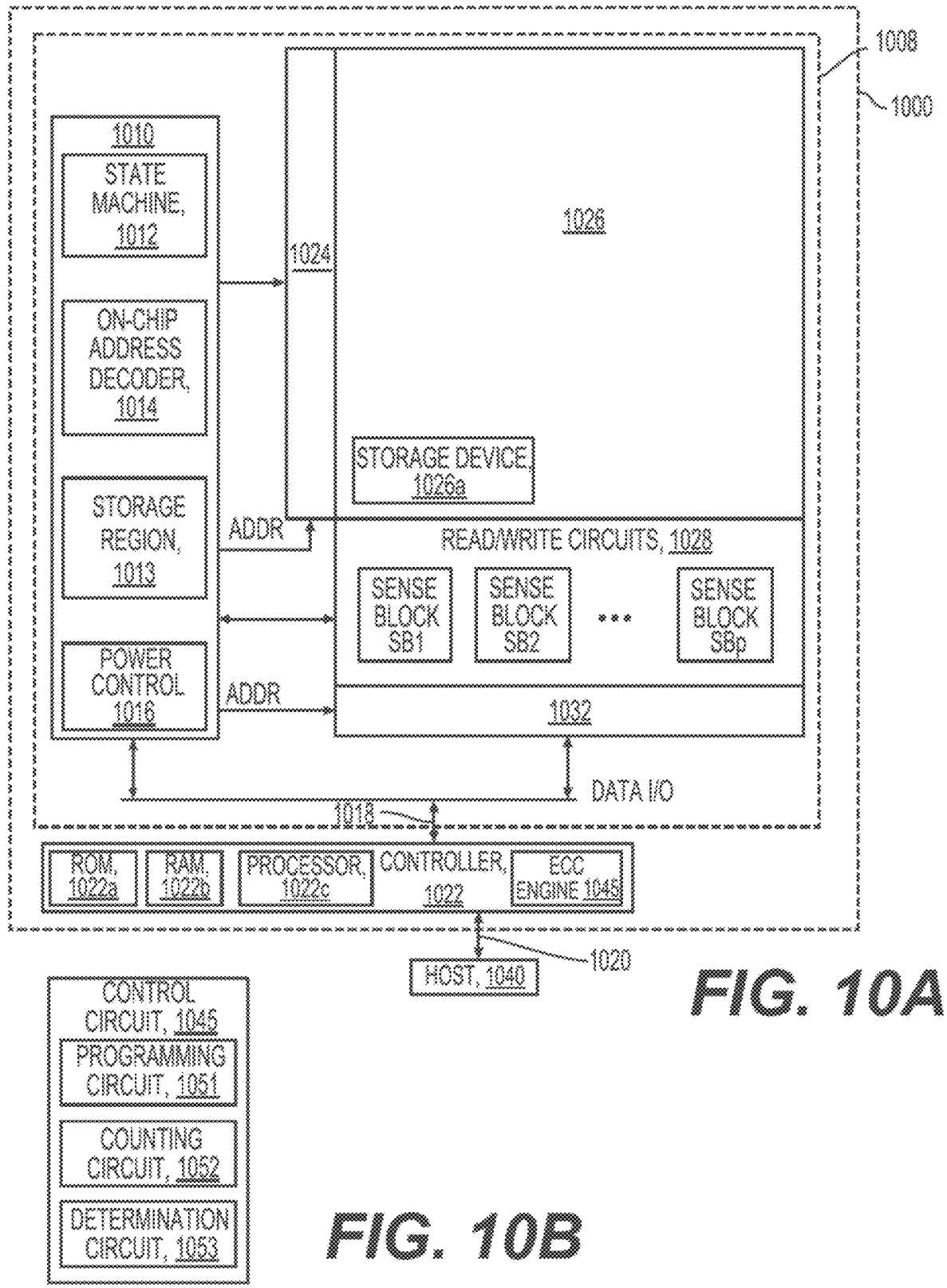
FIG. 10A is a block diagram of an example memory device.
FIG. 10B is a block diagram of an example control circuit.

FIG. 10A is a block diagram of an example memory device 1000 that is configured to operate according to the programming techniques of the present disclosure. The memory die 1008 includes a memory structure 1026 of memory cells, such as an array of memory cells arranged in memory blocks and word lines, control circuitry 1010, and read/write circuits 1028. The memory structure 1026 is addressable by word lines via a row decoder 1024 and by bit lines via a column decoder 1032. The read/write circuits 1028 include multiple sense blocks SB1, SB2, . . . SBp (sensing circuitry) and allow a page of memory cells to be read or programmed in parallel. Typically, a controller 1022 is included in the same memory device 1000 (e.g., a removable storage card) as the one or more memory die 1008. Commands and data are transferred between the host 1040 and controller 1022 via a data bus 1020, and between the controller and the one or more memory die 1008 via lines 1018.

The memory structure 1026 can be two-dimensional or three-dimensional. The memory structure 1026 may comprise one or more array of memory cells including a three-dimensional array. The memory structure 1026 may comprise a monolithic three-dimensional memory structure in which multiple memory levels are formed above (and not in) a single substrate, such as a wafer, with no intervening substrates. The memory structure 1026 may comprise any type of non-volatile memory that is monolithically formed in one or more physical levels of arrays of memory cells having an active area disposed above a silicon substrate. The memory structure 1026 may be in a non-volatile memory device having circuitry associated with the operation of the memory cells, whether the associated circuitry is above or within the substrate.

Figure 10C:
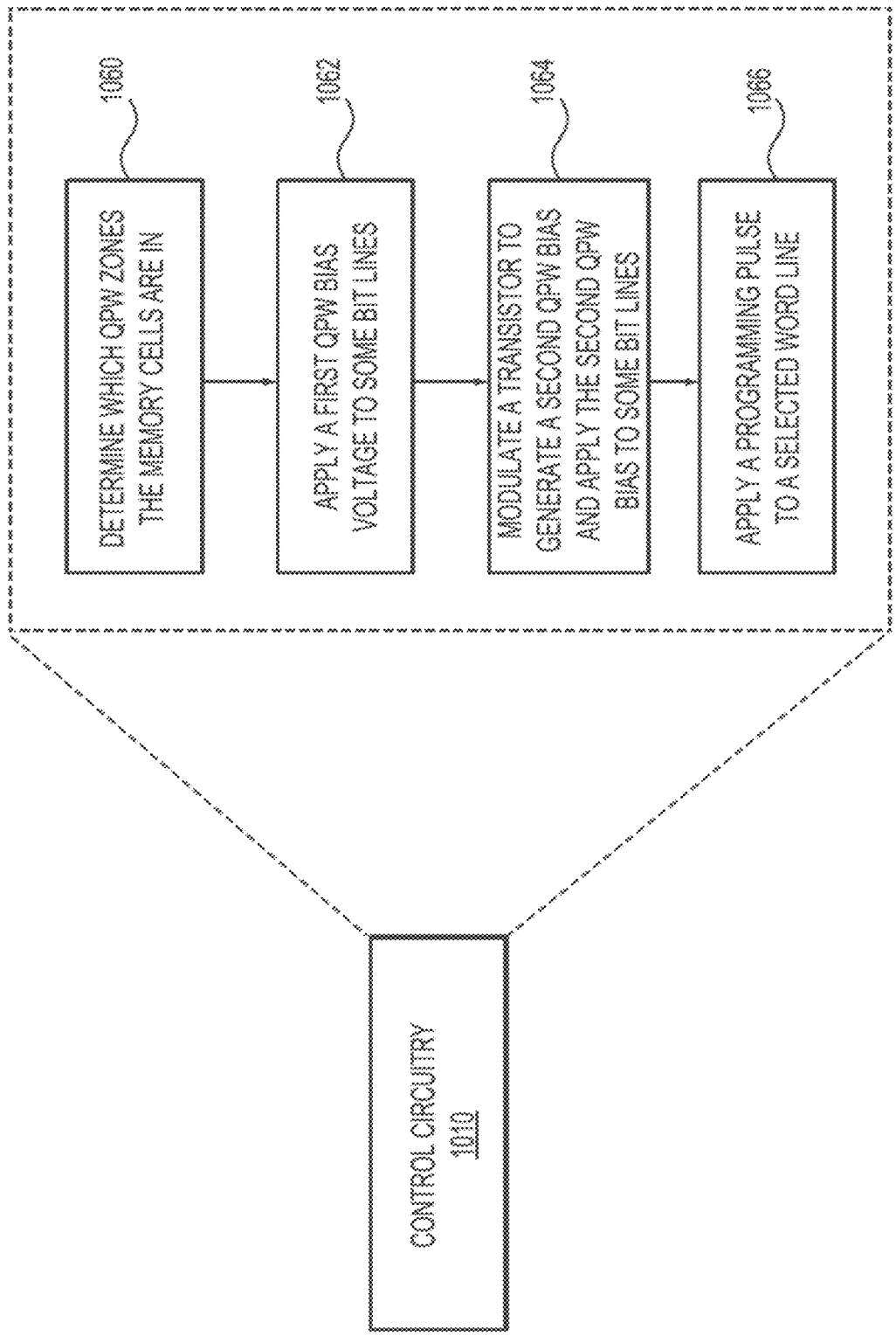
FIG. 10C is another block diagram of an example control circuit.

The control circuitry 1010 cooperates with the read/write circuits 1028 to perform memory operations on the memory structure 1026, and includes a state machine 1012, an on-chip address decoder 1014, and a power control module 1016. The state machine 1012 provides chip-level control of memory operations. As discussed in further detail below and illustrated briefly in FIG. 10C, the control circuitry 1010 is configured to program the memory cells of a selected word line of a plurality of word lines according to a programming technique where the multiple QPW bias voltages are generated using only a single QPW voltage source. At step 1060, the control circuitry determines if the threshold voltages Vts of the memory cells of the selected word line fall within QPW zones and, if so, which of multiple QPW zones. At step 1062, the control circuitry directly applies a first QPW bias voltage from the single QPW voltage source to the bit lines that are coupled to the memory cells with threshold voltages Vts in one QPW zone. At step 1064, the control circuitry modulates a QPW transistor to generate a second QPW bias voltage, which is less than the first QPW bias voltage, and applies the second QPW bias voltage to the bit lines coupled to memory cells with threshold voltages Vt in another QPW zone. At step 1066, the control circuitry applies a programming pulse to a selected word line to program the uninhibited memory cells in the selected word line. As discussed in further detail below, the memory cells that receive the first QPW bias voltage are programmed more slowly (their threshold voltages Vts rise at a slower rate) than the memory cells that receive the second QPW bias voltage and than the memory cells that do not receive a QPW bias voltage.

Turning back to FIG. 10A, a storage region 1013 may, for example, be provided for programming parameters. The programming parameters may include a program voltage, a program voltage bias, position parameters indicating positions of memory cells, contact line connector thickness parameters, a verify voltage, and/or the like. The position parameters may indicate a position of a memory cell within the entire array of NAND strings, a position of a memory cell as being within a particular NAND string group, a position of a memory cell on a particular plane, and/or the like. The contact line connector thickness parameters may indicate a thickness of a contact line connector, a substrate or material that the contact line connector is comprised of, and/or the like.

The on-chip address decoder 1014 provides an address interface that is used by the host or a memory controller to determine the hardware address used by the decoders 1024 and 1032. The power control module 1016 controls the power and voltages supplied to the word lines and bit lines during memory operations. It can include drivers for word lines, SGS and SGD transistors, and source lines. The sense blocks can include bit line drivers, in one approach. An SGS transistor is a select gate transistor at a source end of a NAND string, and an SGD transistor is a select gate transistor at a drain end of a NAND string.

In some embodiments, some of the components can be combined. In various designs, one or more of the components (alone or in combination), other than memory structure 1026, can be thought of as at least one control circuit which is configured to perform the actions described herein. For example, a control circuit may include any one of, or a combination of, control circuitry 1010, state machine 1012, decoders 1014/1032, power control module 1016, sense blocks SBb, SB2, . . . , SBp, read/write circuits 1028, controller 1022, and so forth.

The control circuits can include a programming circuit configured to perform a program and verify operation for one set of memory cells, wherein the one set of memory cells comprises memory cells assigned to represent one data state among a plurality of data states and memory cells assigned to represent another data state among the plurality of data states; the program and verify operation comprising a plurality of program and verify iterations; and in each program and verify iteration, the programming circuit performs programming for the one selected word line after which the programming circuit applies a verification signal to the selected word line. The control circuits can also include a counting circuit configured to obtain a count of memory cells which pass a verify test for the one data state. The control circuits can also include a determination circuit configured to determine, based on an amount by which the count exceeds a threshold, if a programming operation is completed. For example, FIG. 10B is a block diagram of an example control circuit 1050 which comprises a programming circuit 1051, a counting circuit 1052, and a determination circuit 1053.

The off-chip controller 1022 may comprise a processor 1022c, storage devices (memory) such as ROM 1022a and RAM 1022b and an error-correction code (ECC) engine 1045. The ECC engine can correct a number of read errors which are caused when the upper tail of a Vt distribution becomes too high. However, uncorrectable errors may exist in some cases. The techniques provided herein reduce the likelihood of uncorrectable errors.

The storage device(s) 1022a, 1022b comprise, code such as a set of instructions, and the processor 1022c is operable to execute the set of instructions to provide the functionality described herein. Alternately or additionally, the processor 1022c can access code from a storage device 1026a of the memory structure 1026, such as a reserved area of memory cells in one or more word lines. For example, code can be used by the controller 1022 to access the memory structure 1026 such as for programming, read and erase operations. The code can include boot code and control code (e.g., set of instructions). The boot code is software that initializes the controller 1022 during a booting or startup process and enables the controller 1022 to access the memory structure 1026. The code can be used by the controller 1022 to control one or more memory structures 1026. Upon being powered up, the processor 1022c fetches the boot code from the ROM 1022a or storage device 1026a for execution, and the boot code initializes the system components and loads the control code into the RAM 1022b. Once the control code is loaded into the RAM 1022b, it is executed by the processor 1022c. The control code includes drivers to perform basic tasks such as controlling and allocating memory, prioritizing the processing of instructions, and controlling input and output ports.

Generally, the control code can include instructions to perform the functions described herein including the steps of the flowcharts discussed further below and provide the voltage waveforms including those discussed further below.

In one embodiment, the host is a computing device (e.g., laptop, desktop, smartphone, tablet, digital camera) that includes one or more processors, one or more processor readable storage devices (RAM, ROM, flash memory, hard disk drive, solid state memory) that store processor readable code (e.g., software) for programming the one or more processors to perform the methods described herein. The host may also include additional system memory, one or more input/output interfaces and/or one or more input/output devices in communication with the one or more processors.

Other types of non-volatile memory in addition to NAND flash memory can also be used.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse or phase change material, and optionally a steering element, such as a diode or transistor. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND string is an example of a set of series-connected transistors comprising memory cells and SG transistors.

A NAND memory array may be configured so that the array is composed of multiple memory strings in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured. The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements is formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the z-direction is substantially perpendicular and the x- and y-directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional array of NAND strings, the memory elements may be coupled together to form a NAND string within a single horizontal (e.g., x-y) memory device level. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Figure 11:
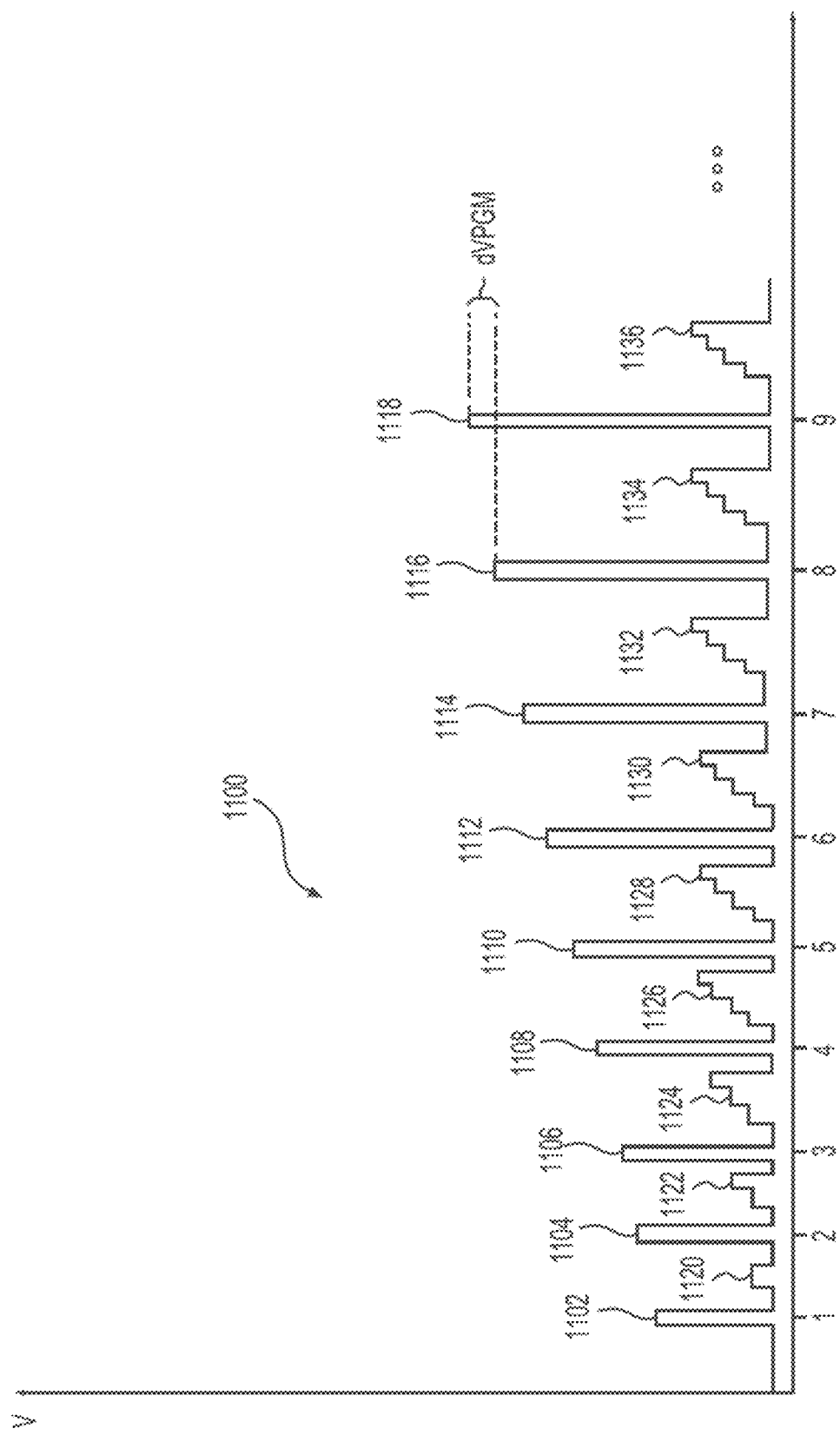
FIG. 11 is a voltage waveform of the voltage applied to a control gate of a selected word line during a programming operation.

Programming the memory cells occurs on a word line-by-word line basis from one side of the memory block towards an opposite side of the memory block. Typically, programming the memory cells of a selected word line to retain multiple bits per memory cell (for example, MLC, TLC, or QLC) starts with the memory cells being in the erased data state and includes a plurality of program loops, and each program loop includes both a programming pulse and a verify operation. FIG. 11 depicts a waveform 1100 of the voltages applied to a selected word line during an example programming operation for programming the memory cells of the selected word line to a greater number of bits per memory cell (e.g., TLC or QLC). As depicted, each program loop includes a programming pulse (hereinafter referred to as a VPGM pulse) and one or more verify pulses, depending on which data states are being programmed in a particular program loop. A square waveform is depicted for each pulse for simplicity; however, other shapes are possible, such as a multilevel shape or a ramped shape.

Incremental Step Pulse Programming (ISPP) is used in this example pulse train, which means that the VPGM pulse voltage steps up, or increases, in each successive program loop. More specifically, the pulse train includes VPGM pulses that increase stepwise in amplitude with each successive program loop by a fixed program voltage step size (dVPGM). A new pulse train starts with the VPGM pulse being at a starting voltage VPGMU and ends with it being at a final VPGM pulse voltage, which does not exceed a maximum allowed voltage. The example pulse train 1100 includes a series of VPGM pulses 1101-1115 that are applied to a control gate of the selected word line to program the memory cells of that word line and that increase in amplitude by the program voltage step size dVPGM between pulses.

Figure 1:
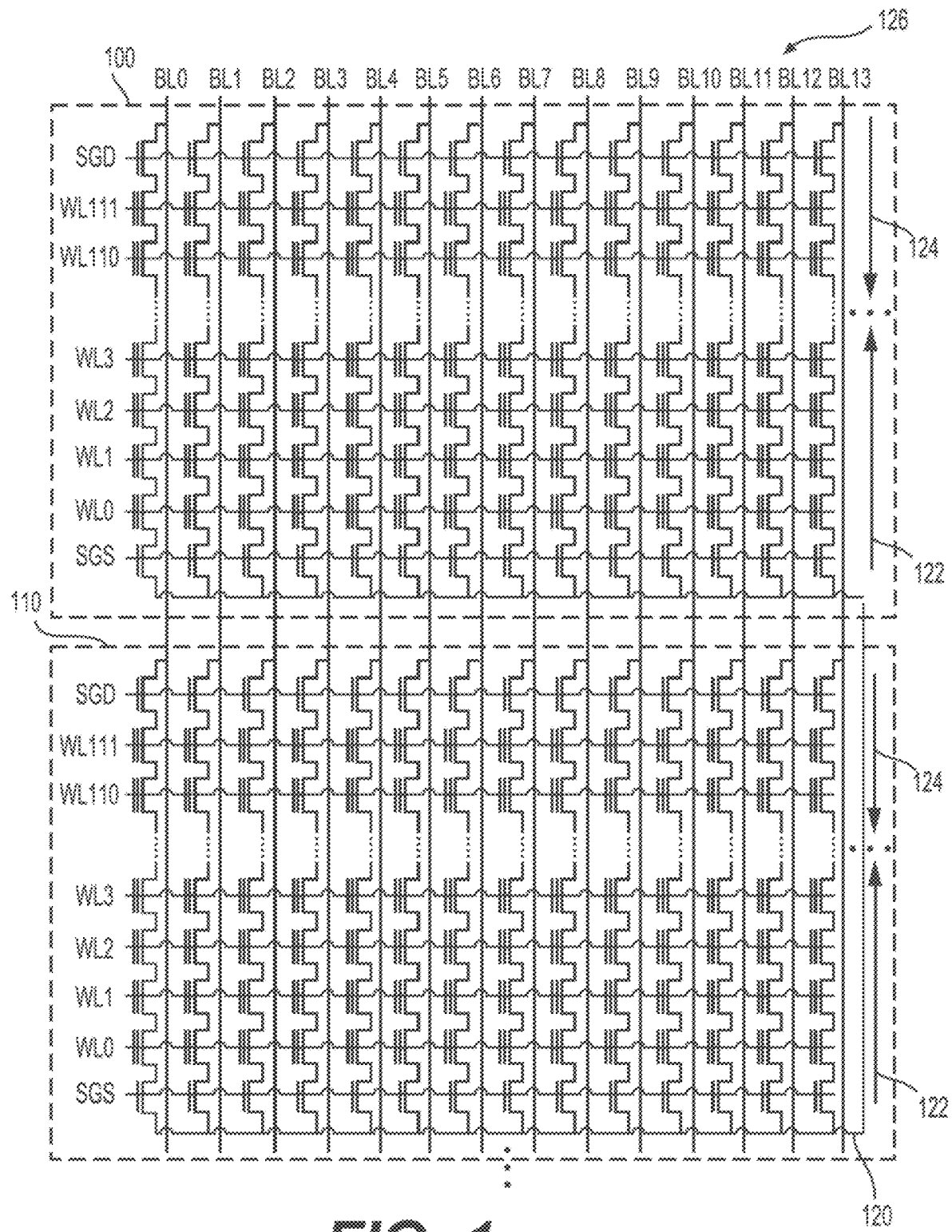
FIG. 1 depicts blocks of memory cells in an example two-dimensional configuration of a memory array.
Figure 2A:
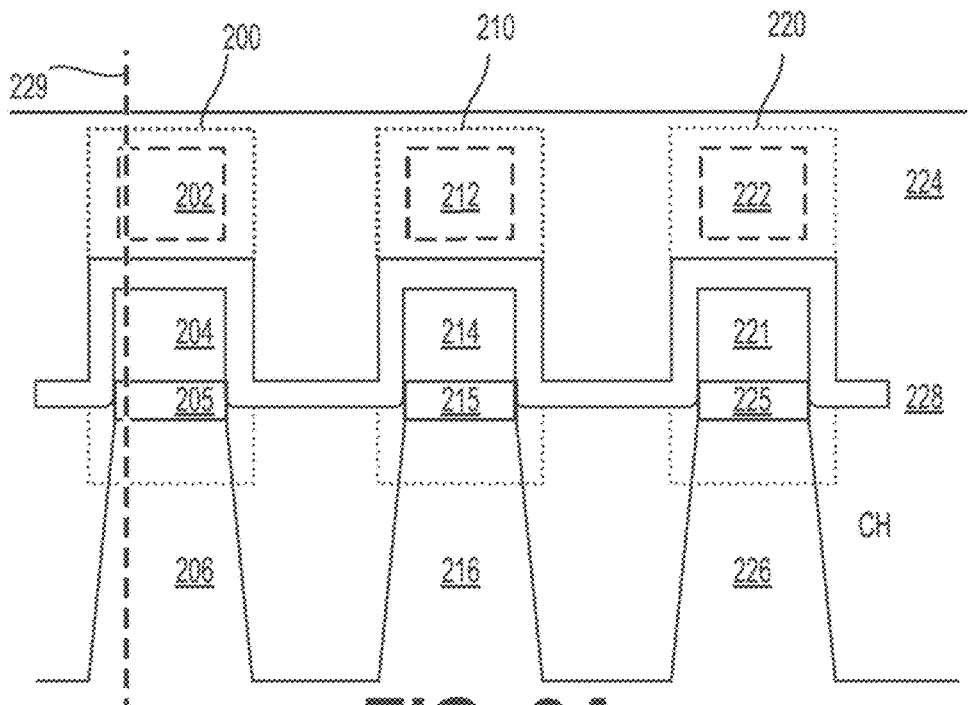
FIG. 2A and FIG. 2B depict cross-sectional views of example floating gate memory cells in NAND strings.
Figure 2B:
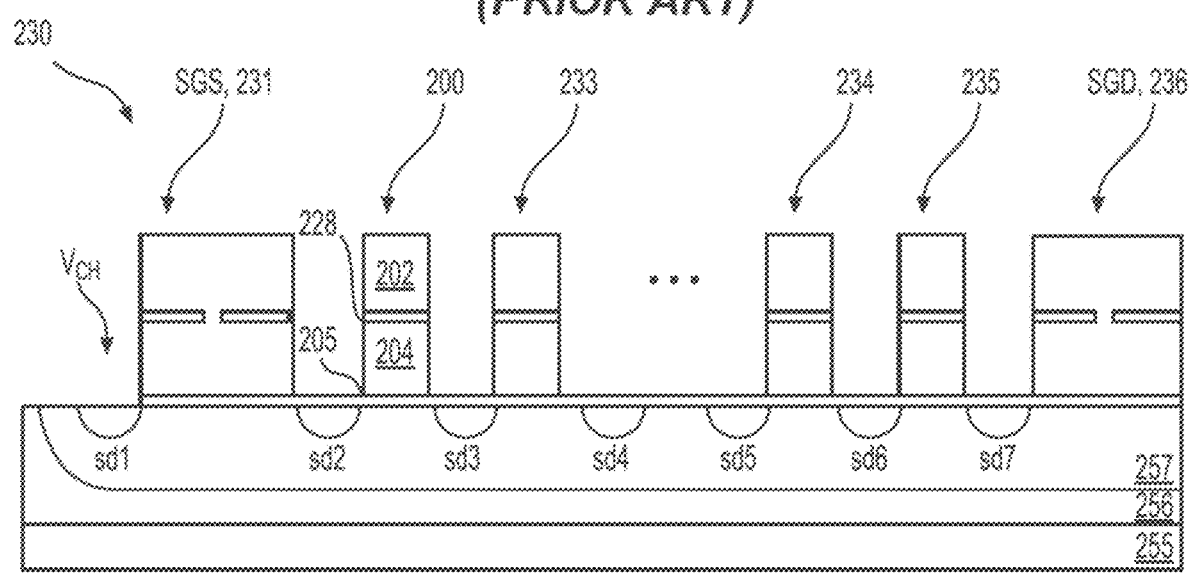
Figure 3A:
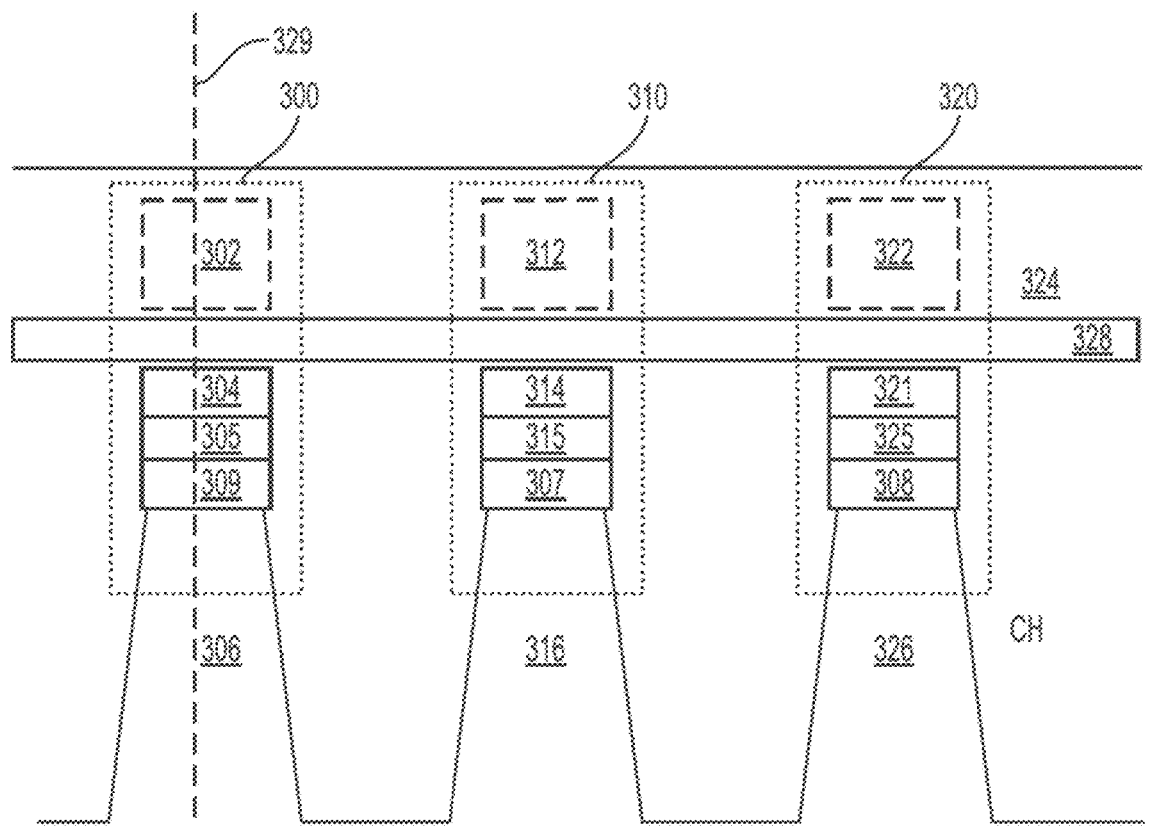
FIG. 3A and FIG. 3B depict cross-sectional views of example charge-trapping memory cells in NAND strings.
Figure 3B:
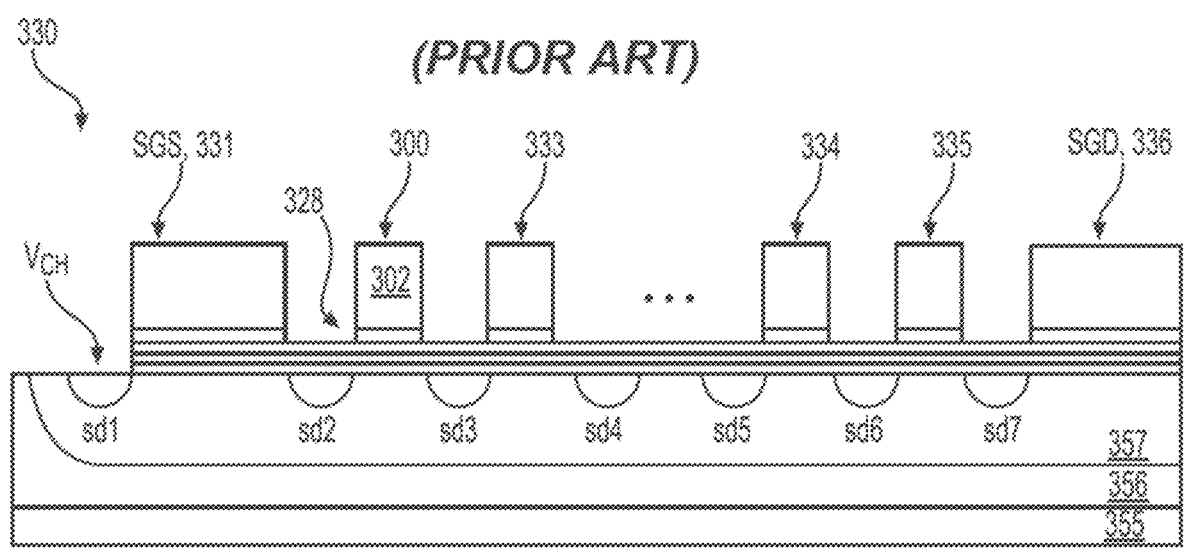
Figure 4:
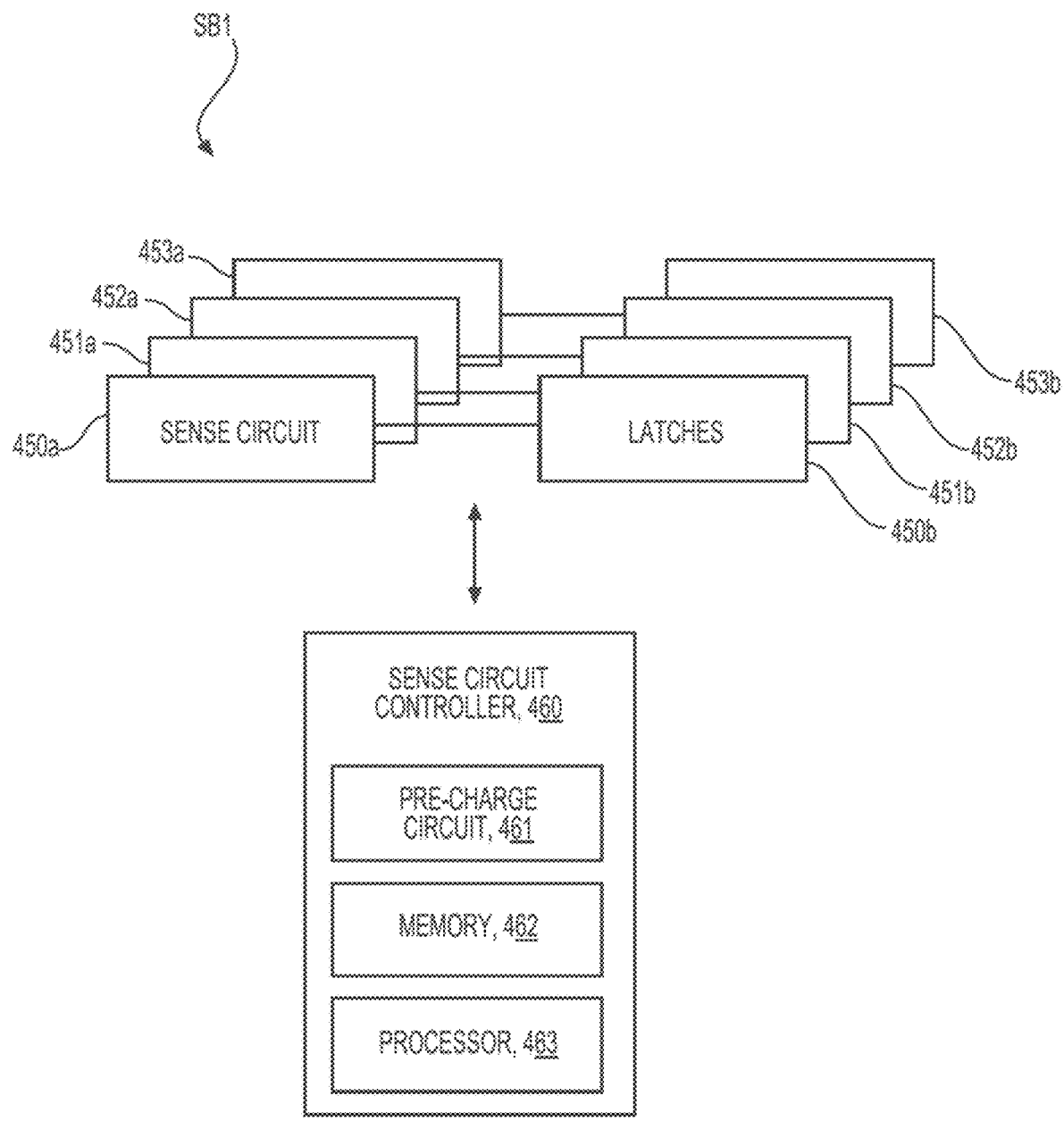
FIG. 4 depicts an example block diagram of a sense block SB1.
Figure 5A:
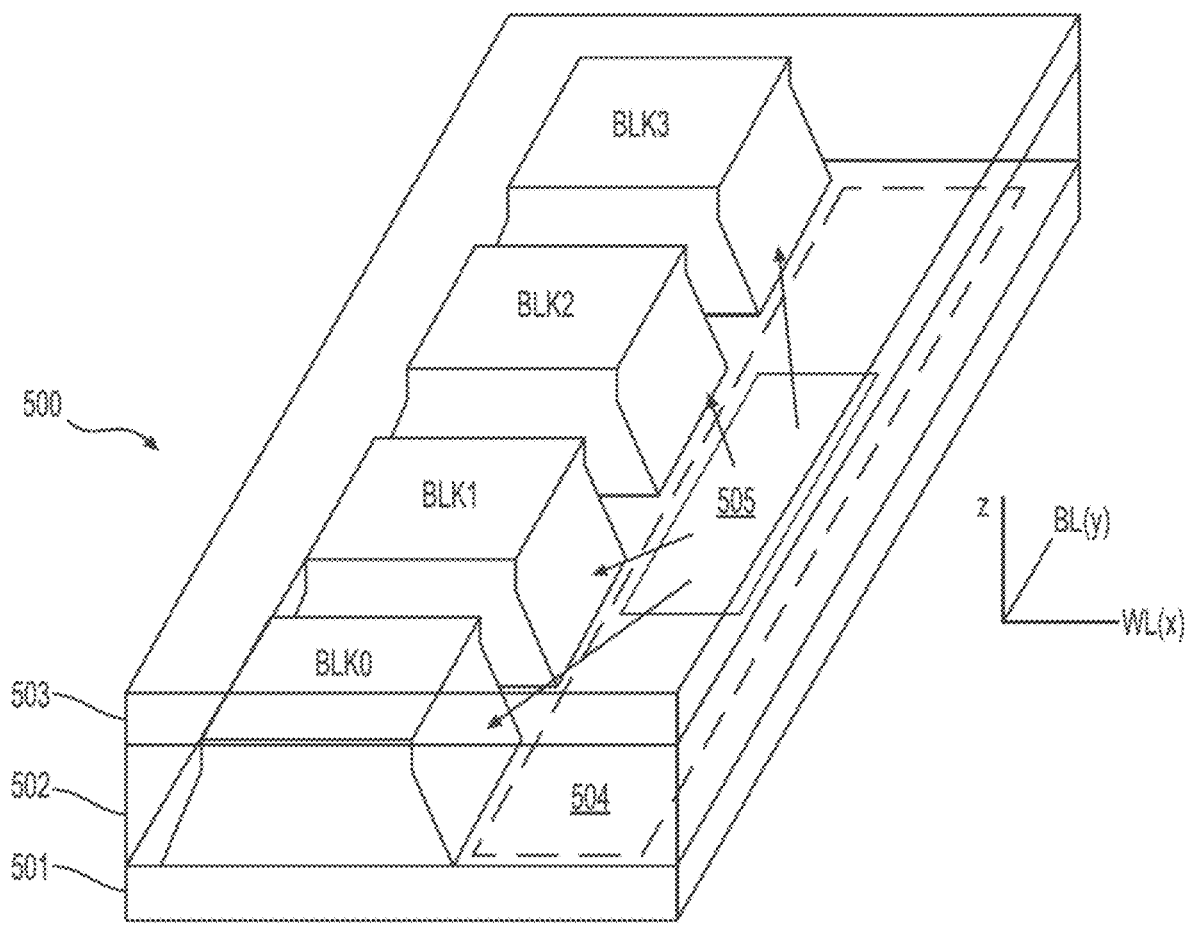
FIG. 5A is a perspective view of a set of blocks in an example three-dimensional configuration of a memory array.
Figure 5B:
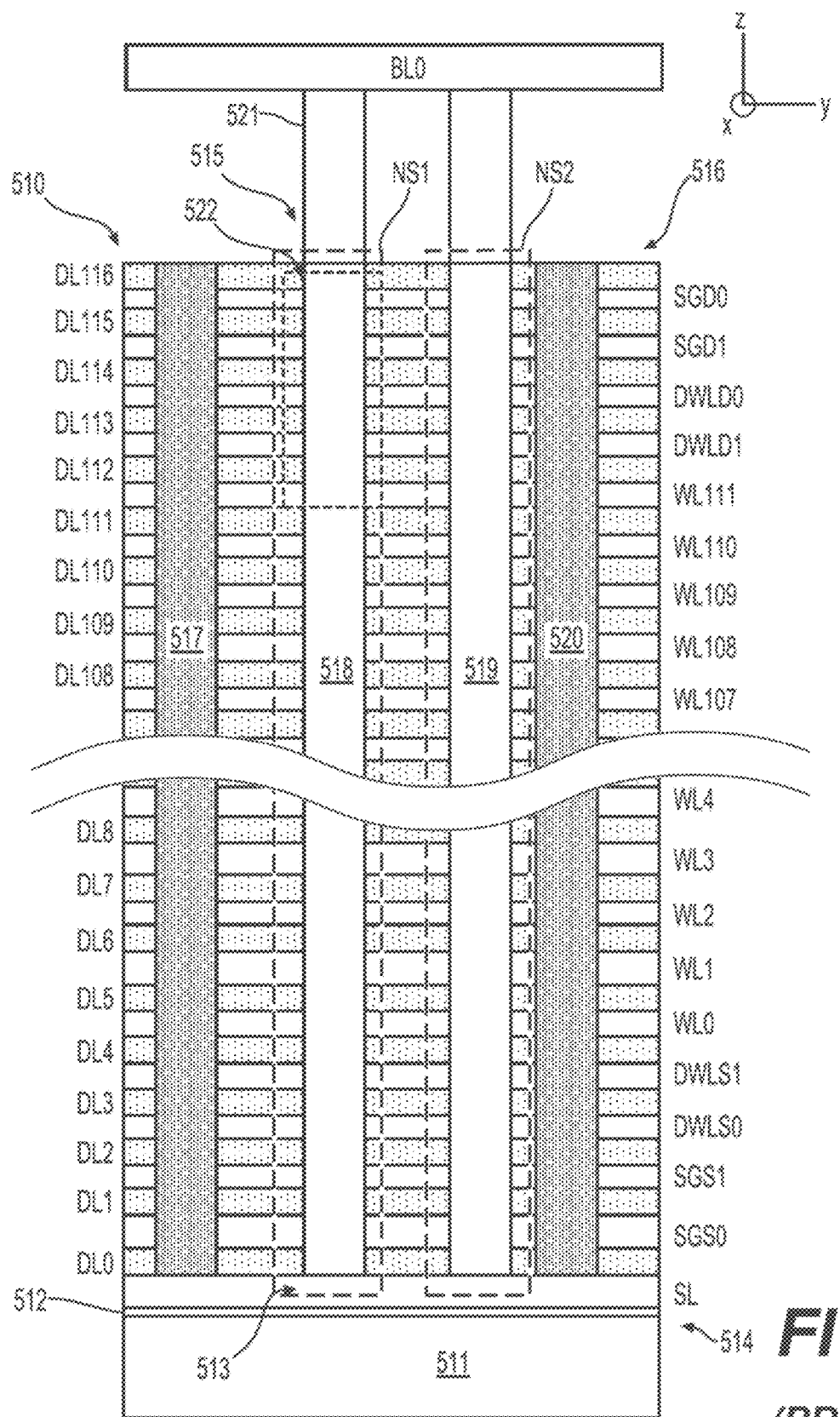
FIG. 5B depicts an example cross-sectional view of a portion of one of the blocks of FIG. 5A.
Figure 5C:
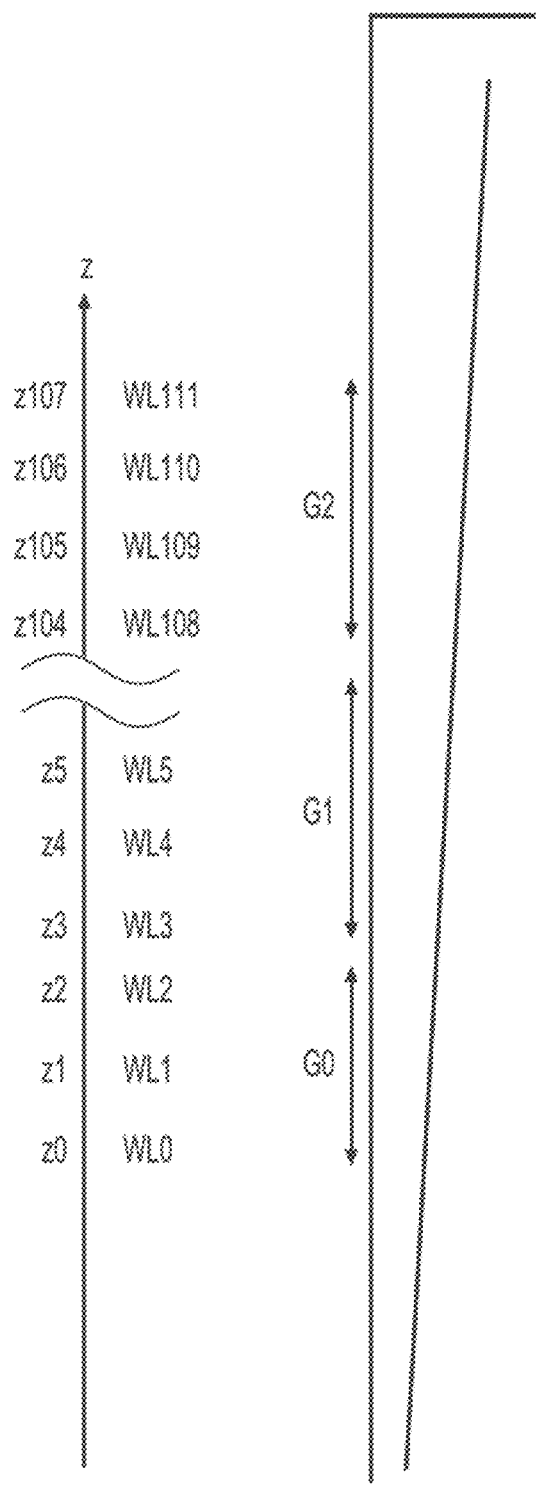
FIG. 5C depicts a plot of memory hole diameter of the stack of FIG. 5B.
Figure 5D:
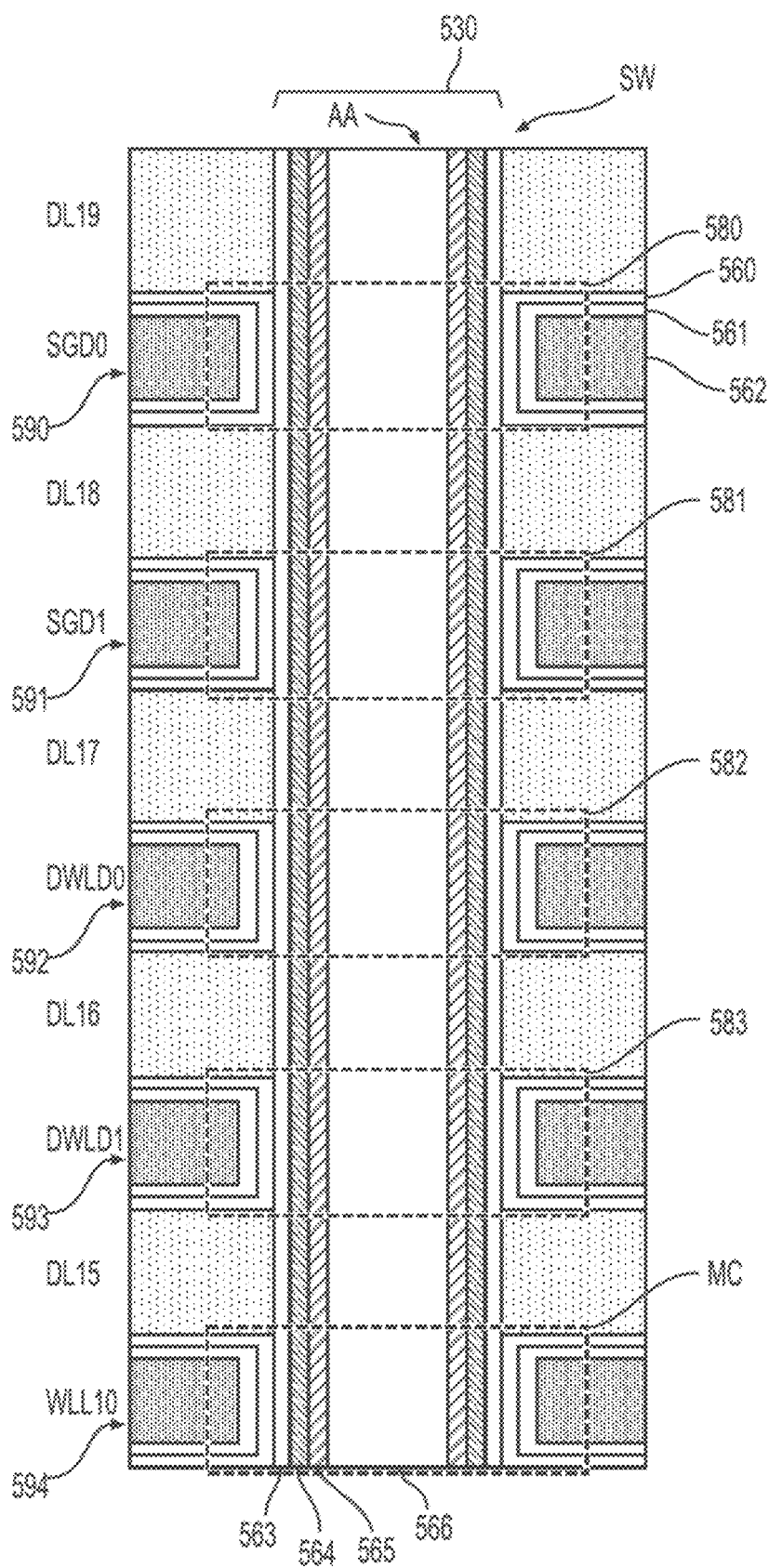
FIG. 5D depicts a close-up view of region 522 of the stack of FIG. 5B.
Figure 6A:
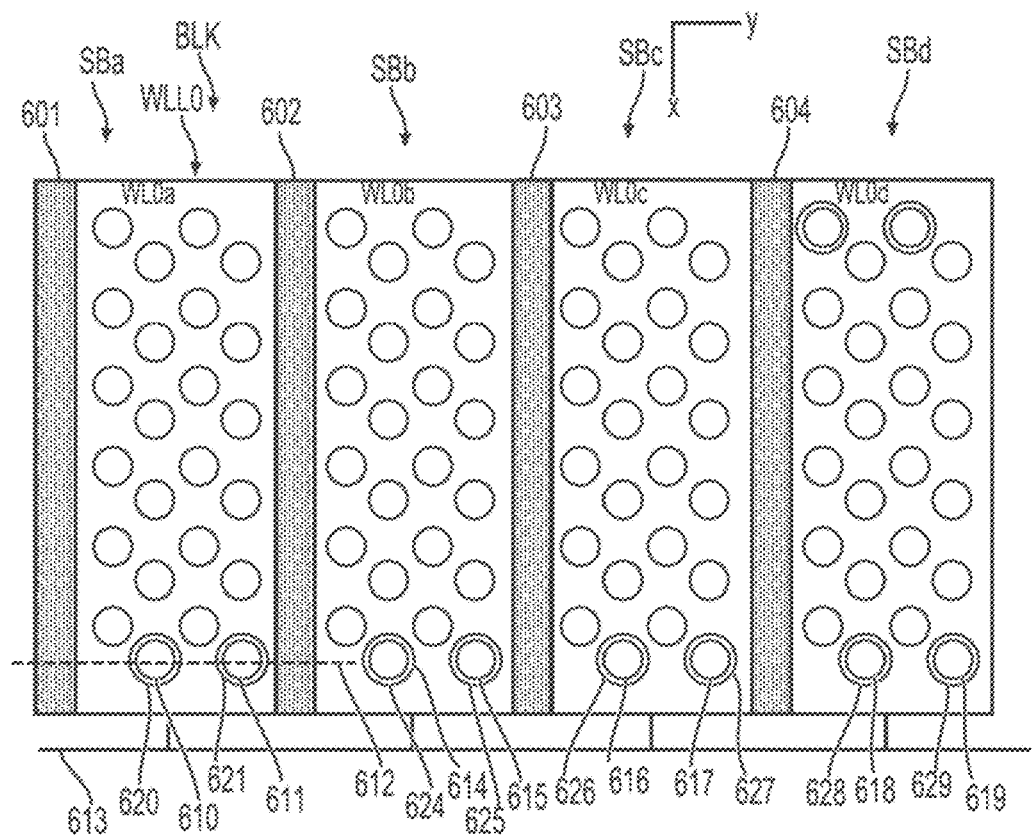
FIG. 6A depicts a top view of an example word line layer WL0 of the stack of FIG. 5B.
Figure 6B:
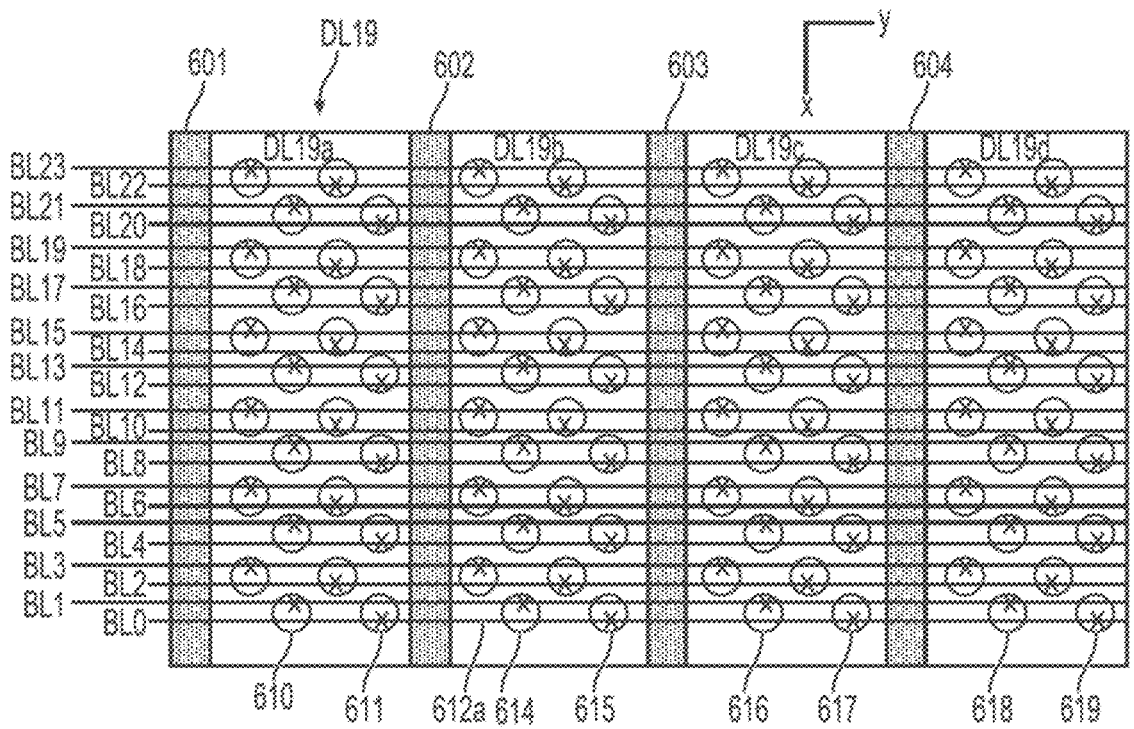
FIG. 6B depicts atop view of an example top dielectric layer DL116 of the stack of FIG. 5B.
Figure 7:
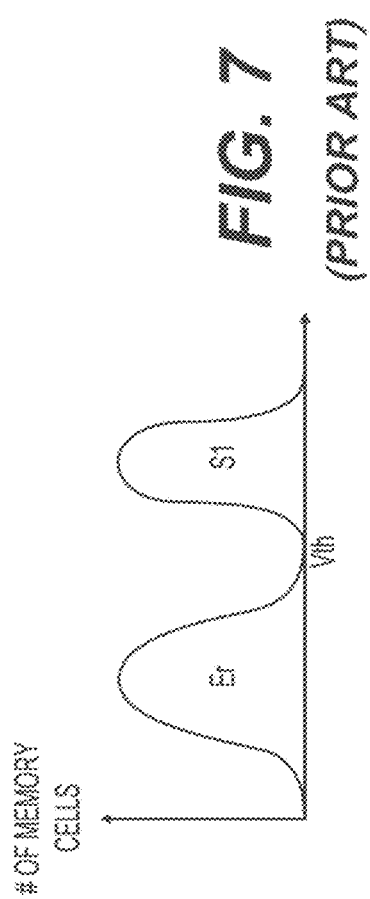
FIG. 7 depicts a threshold voltage distribution of a page of memory cells programmed to one bit per memory cell (SLC)
Figure 8:
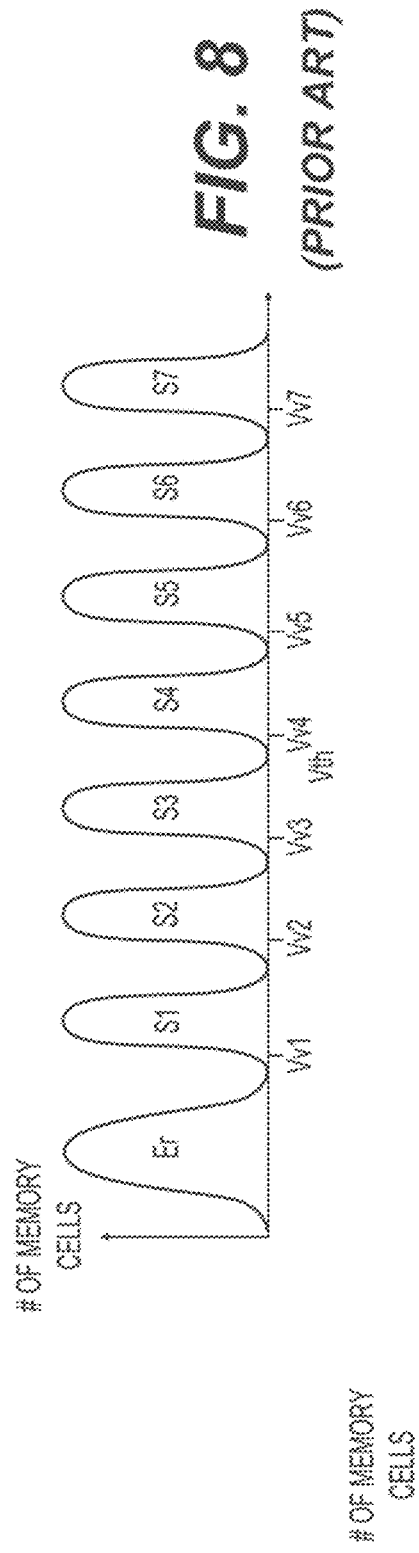
FIG. 8 depicts a threshold voltage distribution of a page of memory cells programmed to three bits per memory cell (TLC)
Figure 9:
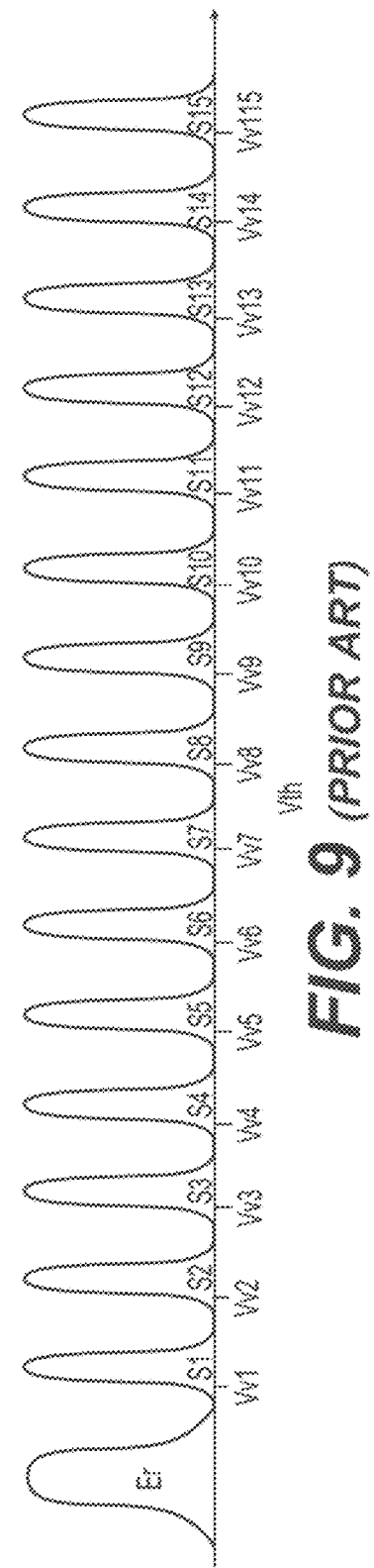
FIG. 9 depicts a threshold voltage distribution of a page of memory cells programmed to four bits per memory cell (QLC)

One or more verify voltage pulses 1116-1129 are provided after each VPGM pulse, based on the target data states which are being verified in the respective program loops. The verify voltages may be the voltages $Vv1$-$Vv7$ shown in FIG. 8 or $Vv1$-$Vv15$ shown in FIG. 9 and/or may be verify low voltages associated with any of the data states, as discussed in further detail below. Concurrent with the application of the verify voltages, a sensing operation can determine whether a particular memory cell in the selected word line has a threshold voltage Vt above the verify voltage Vv associated with its intended data state by sensing a current through a string that contains the memory cell. If the current is relatively high during sensing, this indicates that the memory cell is in a conductive state, such that its threshold voltage Vt is less than the verify voltage Vv. If the current is relatively low during sensing, this indicates that the memory cell is in a non-conductive state, such that its threshold voltage Vt is above the verify voltage Vv. If the memory cell passes verify, programming of that memory cell is completed and further programming of that memory cell is inhibited (or locked out) for all remaining program loops by applying an inhibit voltage to a bit line coupled with the memory cell concurrent with the VPGM pulse and by skipping verify for those memory cells. Programming proceeds until all memory cells of the selected word line pass verify for their intended data states, in which case, programming passes, or until a predetermined maximum number of program loops is exceeded, in which case, programming fails. In some embodiments, the memory cells of a word line can be divided into a series of string groups that can be programmed independently of one another, and programming can commence from one string group to another string group across the word line before proceeding to the next word sequential line in the memory block.

Figure 12:
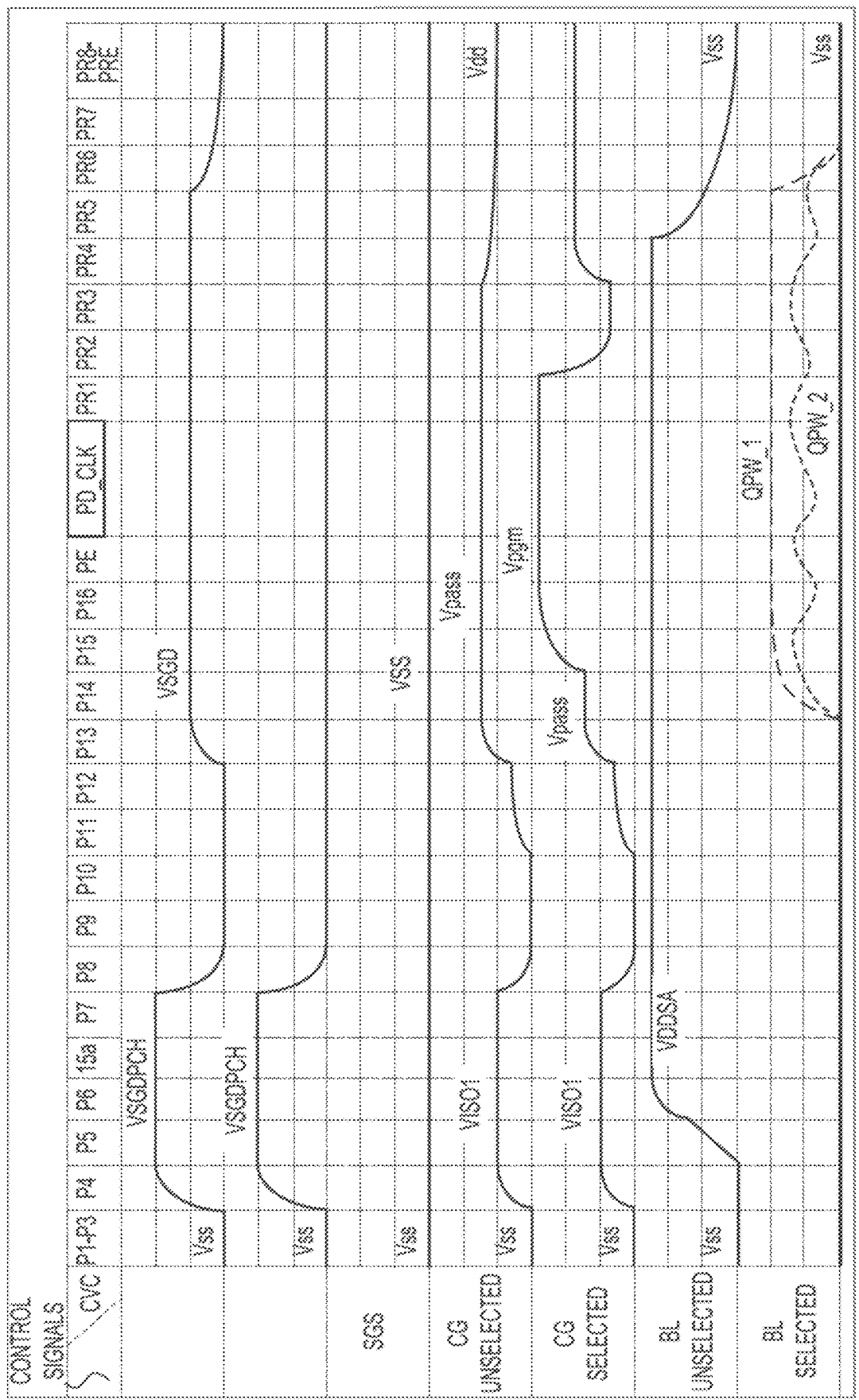
FIG. 12 is a plot of the voltages applied to a plurality of components of a memory block before, during, and after an example programming pulse.

There is a continuing need to develop programming techniques which tighten the threshold voltage Vt distributions of the programmed data states in order to improve Vt margin and programming reliability, but to do so in such a way that the improved reliability does not come at the expense of performance, i.e., programming speed. One such programming technique is known as Quick Pass Write (QPW), which slows programming of the memory cells that have passed a verify low VL voltage but have not passed a verify high VH voltage for a given data state, i.e., memory cells which are nearly finished with programming. As illustrated in FIG. 12, to slow programming, during the application of a VPGM pulse to the control gate of a selected word line, a QPW voltage (QPW_1 or QPW_2) is applied to the bit lines coupled to the memory cells that have passed a verify low VL voltage associated with a programmed data state (e.g., data state S1) but have not passed the verify high VH voltage associated with that programmed data state. The QPW voltage increases the voltage in the channels containing the memory cells for which slow programming is desired, thereby reducing the voltage difference between the VPGM pulse and the channels and slowing the flow of electrons into the charge trapping materials of certain ones of the memory cells being programmed. Any memory cell with a threshold voltage Vt which passes the verify high VH voltage of its intended data state is then locked down, or inhibited, from further programming by applying an inhibit voltage VDDSA to the bit lines coupled to those memory cells during the application of subsequent VPGM pulses to the selected word line.

Figure 13:
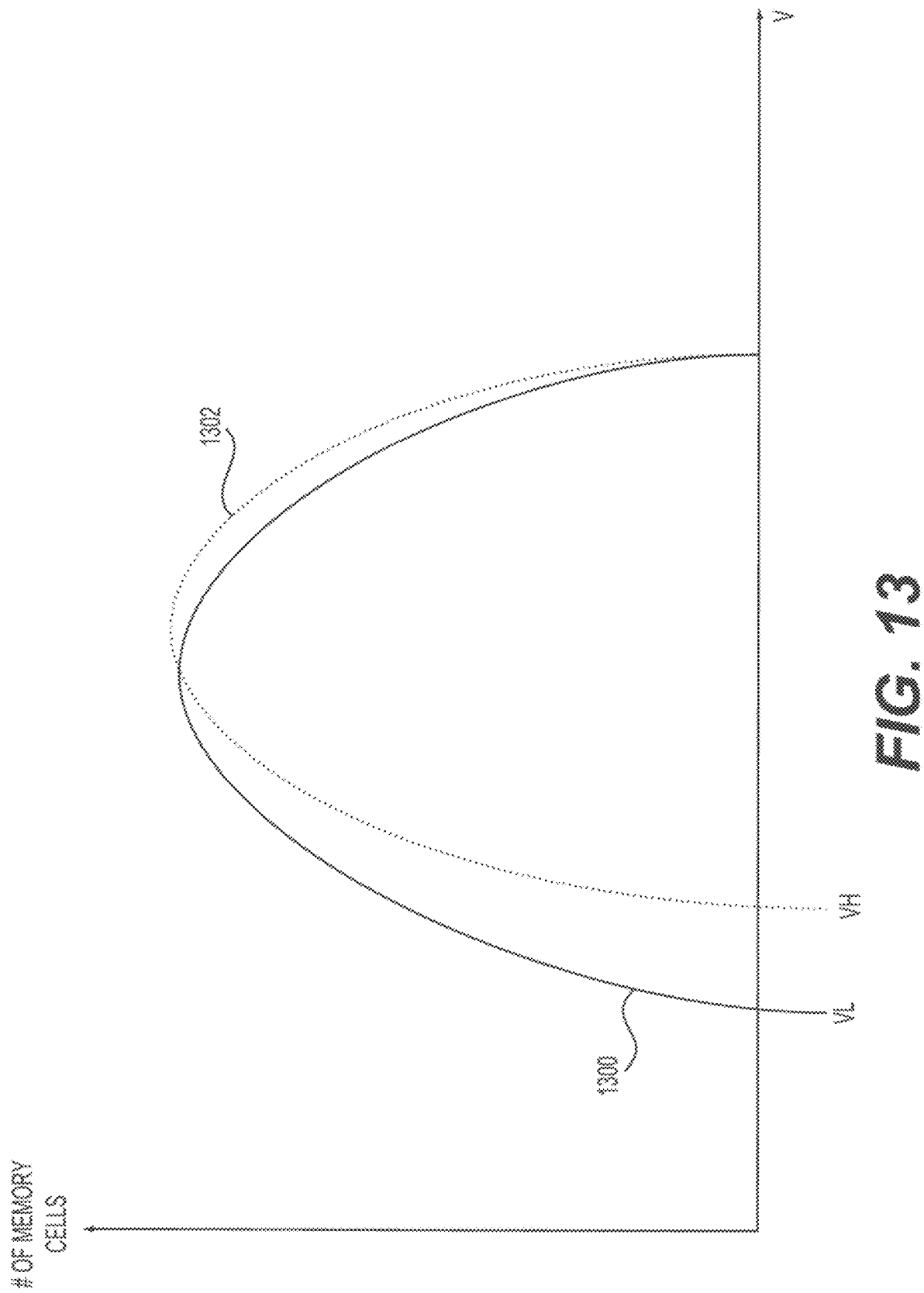
FIG. 13 is a threshold voltage distribution of a plurality of memory cells both before programming is completed and after programming is completed while using a QPW programming technique.

Turning now to FIG. 13, shown are the Vt distributions of the memory cells being programmed to a given programmed data state (e.g., data state S1) at different points in a programming operation. Curve 1300 identifies the Vt distribution of the memory cells after a given VPGM pulse, and curve 1302 identifies the Vt distribution of the same memory cells after a subsequent VPGM pulse. As shown, in curve 1300, some of the memory cells fall between verify low VL and verify high VH and some of the memory cells fall above verify high VH. During the subsequent VPGM pulse, programming is inhibited for the memory cells that have threshold voltages Vts which fall above verify high VH, and programming is slowed via QPW programming for the memory cells that have threshold voltages Vts that fall in a QPW zone between verify low VL and verify high VH. After the subsequent VPGM pulse, curve 1302 illustrates that the Vt distribution has been tightened, and substantially all of the memory cells now fall above VH such that programming to this given data state is completed.

Figure 14A:
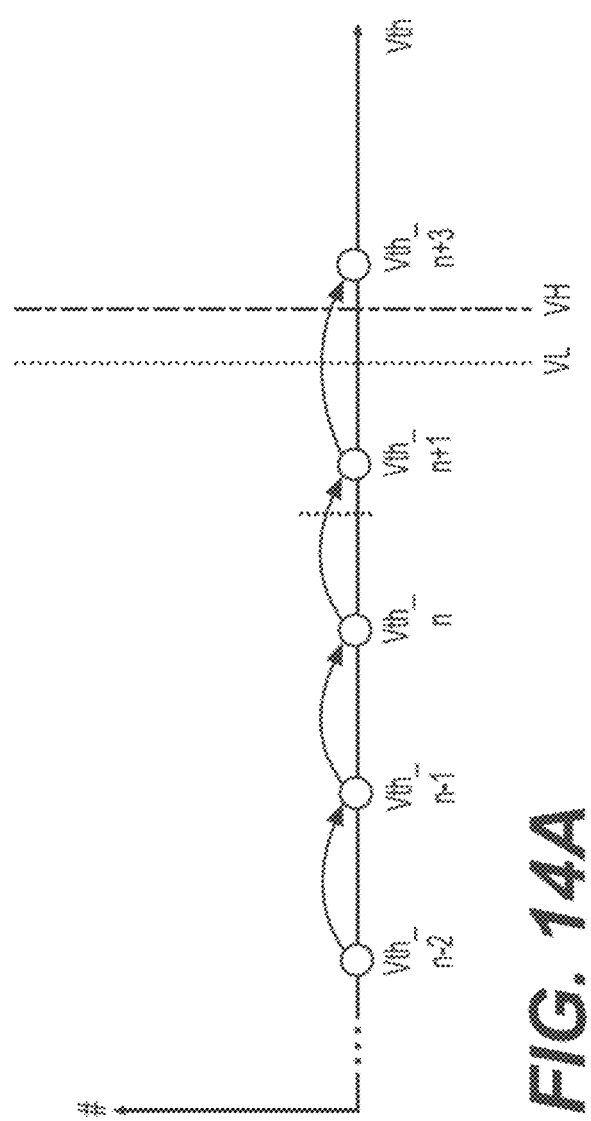
FIG. 14A is a plot of the threshold voltage of a memory cell following a plurality of program loops where there is a single, small QPW zone.
Figure 14B:
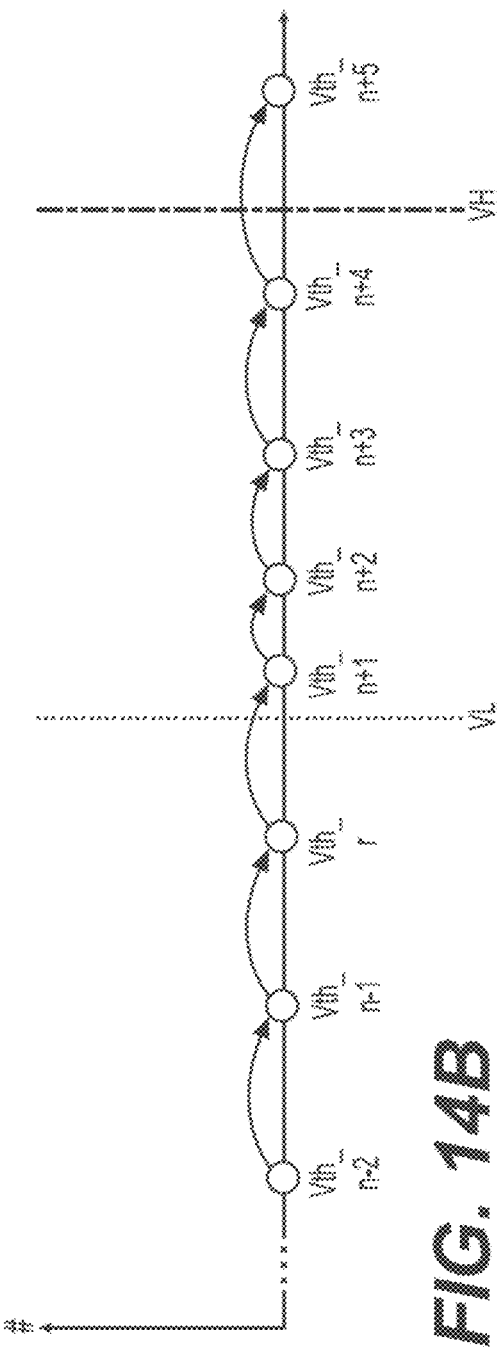
FIG. 14B is a plot of the threshold voltage of a memory cell following a plurality of program loops where there is a single, large QPW zone.

For QPW programming to be effective, the QPW zone, or the voltage gap between VL and VH, should be maintained at an optimal level. If the voltage gap between VL and VH is too small, some memory cells may miss VL sensing and may be over-programmed, as shown in the plot of FIG. 14A with each point identifying the threshold voltage Vt of a particular memory cell following a VPGM pulse. On the other hand, QPW programming only slows programming for a few (for example, two or three) program loops. Therefore, if the voltage gap between VL and VH is too large, then some memory cells might get back to non-QPW programming speeds even within the QPW zone and end up being overprogrammed, as shown in FIG. 14B. Thus, too large of a voltage gap could lead to overprogramming of some memory cells and increase the Vt distribution rather than decrease the Vt distribution as QPW is intended to do. In many presently preferred embodiments, a memory cell receives the QPW biasing for programming for no more than two VPGM pulses.

Turning now to FIG. 15, another QPW technique (herein referred to as "dual zone QPW") utilizes two verify low VL and a verify high VH voltage to define two QPW zones 1500, 1502 to even more precisely program the memory cells and further tighten the threshold voltage distributions of the programmed data states. Dual zone QPW programming protects against the over-programming issues that could result if a memory cell remains in a single QPW zone for too many VPGM pulses. To accomplish this, the first QPW zone 1500 is defined as the voltage range between a first verify low voltage VL1 and a second verify low voltage VL2 (sometimes also known as a verify middle voltage VM), and the second QPW zone 1502 is defined as the voltage range between the second verify low voltage VL2 and the verify high voltage VH. Memory cells with threshold voltages Vts that fall below the first verify low voltage VL1 receive no QPW biasing voltage such that programming continues at the normal rate, memory cells with threshold voltages Vts in the first QPW zone 1500 receive a second QPW biasing voltage QPW_2 such that programming is slowed, and memory cells with threshold voltages Vts in the second zone 1502 receive a first QPW biasing voltage QPW_1 that is greater than the first QPW biasing voltage QPW_1 such that programming is slowed further for the memory cells with thresholds voltages in the second QPW zone 1502. Thus, the QPW voltage that is applied to a NAND string containing a memory cell that is being programmed can be selected based on if the threshold voltage Vt of the memory cell is in a QPW zone and, if so, which QPW zone the memory cell being programmed is in.

However, it may be costly in terms of chip real estate to supply the necessary componentry to directly generate two different QPW bias voltages using separate QPW voltage sources. In other words, generating two different QPW bias voltages directly may come at the expense of other potential features. For example, supplying multiple QPW biases additional voltage pumps and/or multiple voltage regulators may be required to directly supply multiple QPW bias voltages. Additional data latches may also be necessary as well to store information on which memory cells need which of the two QPW bias voltages.

According to an aspect of the present disclosure, a programming technique is provided that allows two or more QPW bias voltages to be generated for use in dual-zone QPW programming by modulating one of the transistors in the bit line bias supply path. By modulating or cyclically switching the transistor, the transistor effectively becomes a switch which can turn a QPW voltage supply on and off and achieve a smaller effective bias than the QPW supply voltage at the bit line. In other words, a single supply voltage is used to apply either a first QPW voltage QPW_1 or a smaller, second QPW voltage QPW_2 to a bit line depending on which threshold voltage Vt window or zone a memory cell coupled to that bit line is in.

Figure 16:
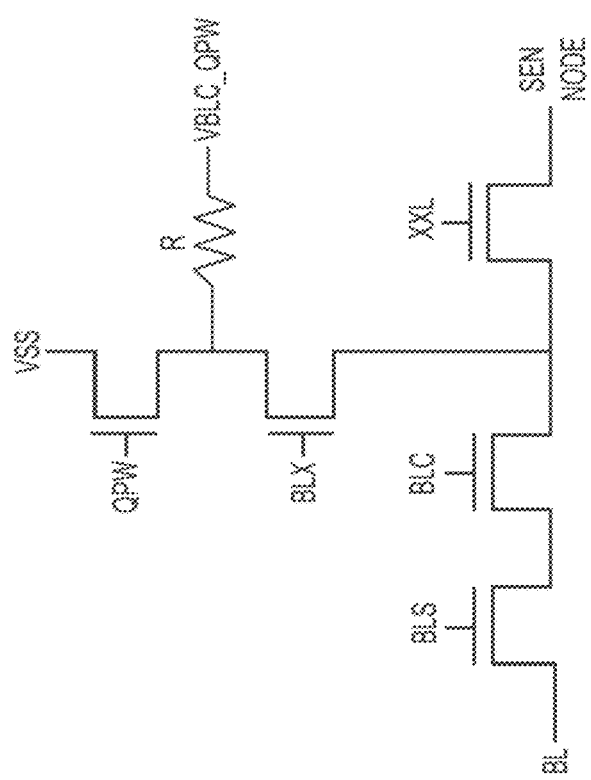
FIG. 16 is an example circuit diagram illustrating a VSS voltage source, a QPW voltage source, and a bit line.

Turning now to FIG. 16, an example circuit for a bit line supply path is provided. The supply path includes a single QPW voltage source, labeled as VBLC_QPW, and a very low (zero or near zero) voltage source VSS or ground. The QPW voltage source VBLC_QPW is set at a voltage that is equal to the first QPW voltage QPW_1. A QPW transistor is located between the VSS voltage source and the VBLC_QPW voltage source and dictates which of these two voltages (VSS or VBLC_QPW) is supplied to the bit line BL. Specifically, if the QPW transistor is turned on, then the voltage supplied to the bit line BL will be VSS because the VBLC_QPW voltage will drop across the resistor R. On the other hand, if the QPW transistor is turned off, then the voltage that is supplied to the bit line BL will be QPW_1.

Referring now additionally to FIG. 15, if a memory cell has a threshold voltage Vt that is below the VL1 voltage of its intended data state (the data state it is being programmed to), then it is below the first QPW zone 1500 and the QPW transistor is turned on to supply the VSS voltage to the bit line BL coupled to that memory cell to maximize the programming speed of that memory cell by maximizing the difference between the voltage of the VPGM pulse and the voltage in the memory hole containing the memory cell. If the memory cell has a threshold voltage Vt in a second zone 1502, which is above the second verify low voltage VL2 but below the verify high voltage VH, then that memory cell is very close to its intended threshold voltage Vt. Accordingly, the QPW transistor is turned off and held off to supply the QPW_1 voltage to the bit line BL coupled to that memory cell during the VPGM pulse to greatly slow programming of that memory cell so that it can be very accurately programmed to the voltage range associated with its intended data state.

Figure 17A:
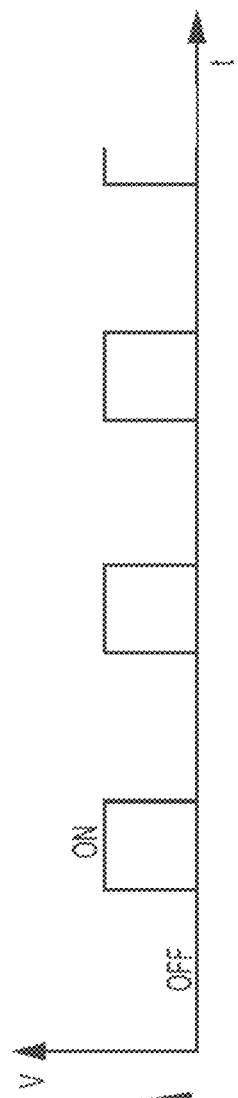
FIG. 17A is a plot of the modulation of a QPW transistor to generate a second QPW bias voltage.
Figure 17B:
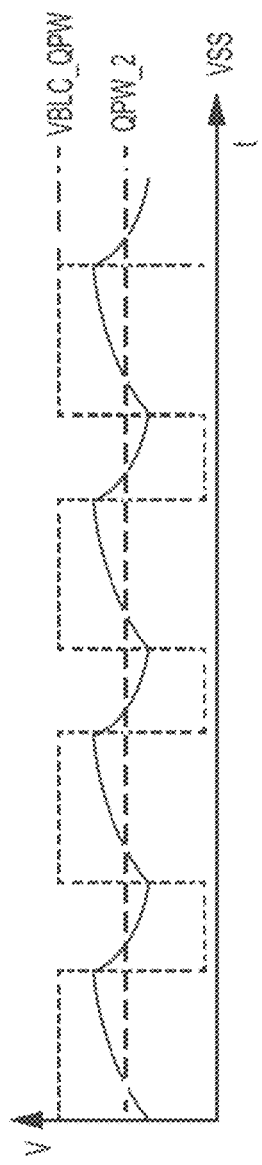
FIG. 17B is the voltage received at the bit line during the modulation of the QPW transistor as illustrated in FIG. 17A.
Figure 18A:
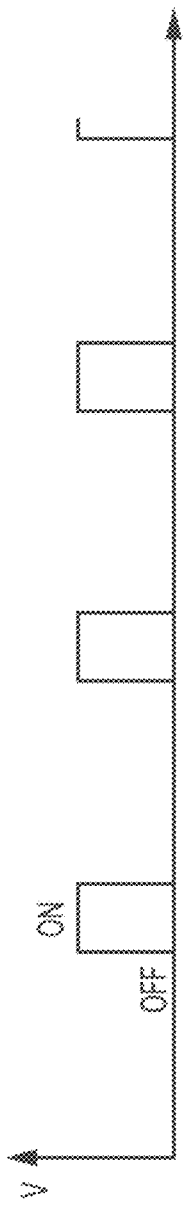
FIG. 18A is a plot of the modulation of a QPW transistor to generate a higher second QPW bias voltage than the second QPW bias voltage of FIG. 17B.
Figure 18B:
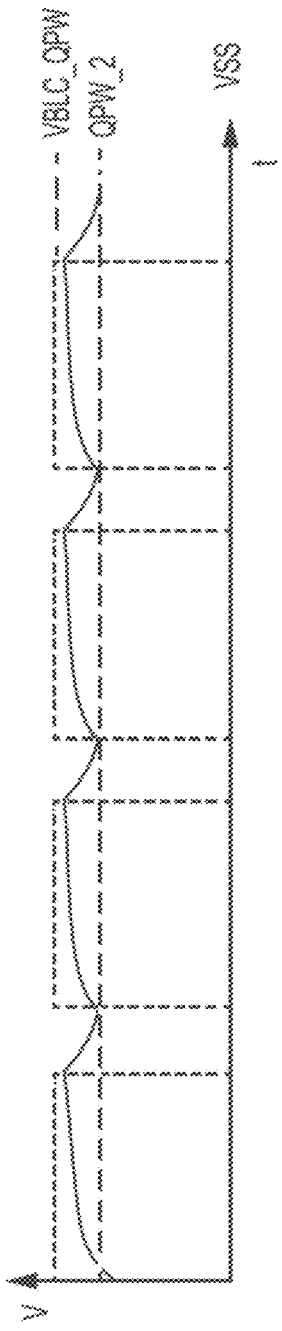
FIG. 18B is the voltage received at the bit line during the modulation of the QPW transistor as illustrated in FIG. 18A.
Figure 19A:
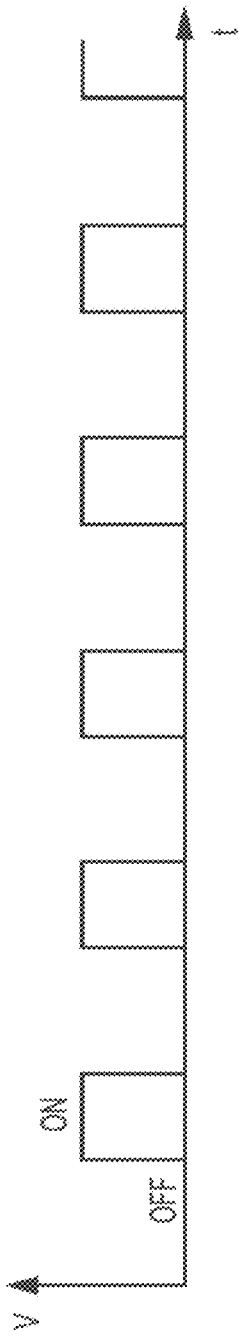
FIG. 19A is a plot of the modulation of a QPW transistor to generate a second QPW bias voltage that is less than the second QPW bias voltage of FIG. 17B.
Figure 19B:
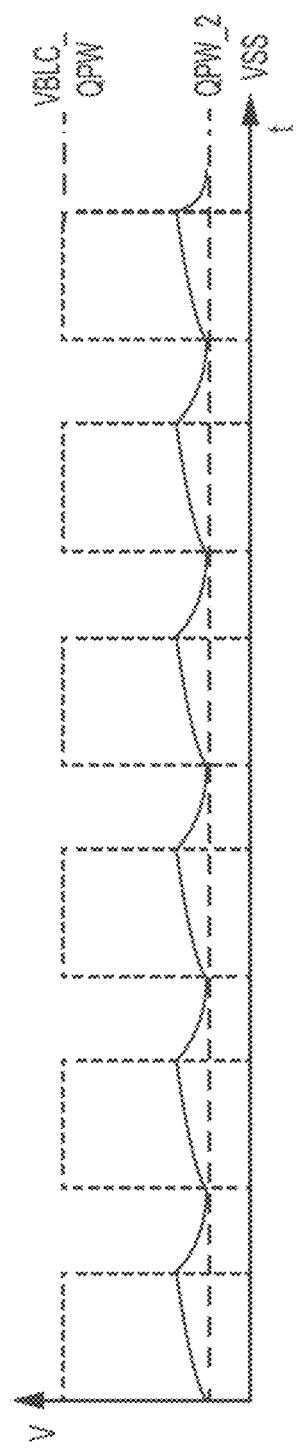
FIG. 19B is the voltage received at the bit line during the modulation of the QPW transistor as illustrated in FIG. 19A.

If the memory cell is sensed as having a threshold voltage Vt that is in the first QPW zone 1500 between the first and second verify low voltages VL1, VL2, then the control circuitry slows the programming by a lesser amount than if the memory cell is in the second QPW zone 1502. Although there is no second QPW voltage source, the QPW_2 voltage is effectively supplied to the bit line BL by modulating or cycling the voltage that is applied to the QPW transistor. Specifically, as illustrated in FIG. 17A, the QPW transistor is alternated between being "on" where the VSS voltage is supplied to the bit line BL and being "off," where the VBLC_QPW voltage is supplied to the bit line BL. As illustrated in FIG. 17B, due to ramping times, by modulating which voltage source (VSS or VBLC_QPW) is connected to the bit line BL, the voltage that is actually received at the bit line BL modulates does not instantly switch between the VSS and VBLC_QPW voltages but rather floats around an average voltage QPW_2. In other words, whenever the QPW transistor is "on", the voltage at the bit line BL ramps down or falls and whenever the QPW transistor is "off," the voltage at the bit line BL ramps up or rises. This rising and falling averages out to the second QPW voltage QPW_2 that is less than the first QPW voltage QPW_1. By adjusting the time that the QPW transistor is on and off, the second QPW voltage QPW_2 can be either increased or decreased to select the optimal level that will optimize both performance and reliability. For example, the second QPW voltage QPW_2 can be increased by increasing the time that the QPW transistor is off in each cycle and/or reducing the time that the QPW transistor is on in each cycle. Similarly, QPW_2 can be decreased by increasing the time that the QPW transistor is on in each cycle and/or reducing the time that the QPW transistor is off in each cycle. For example, FIGS. 18A and 18B illustrate a QPW transistor modulation pattern and the resulting voltage at the bit line BL to achieve a higher second QPW voltage QPW_2, and FIGS. 19A and 19B illustrate the QPW transistor modulation pattern and the resulting voltage at the bit line BL to achieve a lower second QPW voltage QPW_2.

As illustrated in the table of FIG. 20, the control circuitry is configured to automatically apply the VSS voltage or either of the two QPW voltages QPW_1, QPW_2 to the bit line BL using only two data latches. In this example, the two data latches are labeled TDLa and TDLb. The four possible states of these two data latches are 00, 01, 10, and 11, and these states can be assigned to different conditions as illustrated in this Figure. In this example, the status of the QPW transistor is purely based on the TDLb data latch with the status of the QPW transistor being the inverse of the TDLb data latch. For example, if the TDLb data latch is a "0," then the QPW transistor is a "1" and is turned on and if the TDLb data latch is a "1," then the QPW transistor is a "0" and is turned off.

If the TDLa data latch is a "0," then the QPW transistor is held (no modulation) either on or off, depending on the TDLb data latch. If the TDLa data latch is "1," then the control circuitry is hard coded to invert the TDLb data latch at a predetermined frequency to modulate, or cycle, the QPW transistor between the on and off positions such that the bit line BL receives a desirable QPW_2 voltage. The modulation could include holding the QPW transistor on for a first duration (for example, "n" clocks) and holding the QPW off for a second duration (for example, "m" clocks). The first and second durations can be similar or different depending on the QPW_2 voltage that is to be received at the bit line BL.

Figure 21:
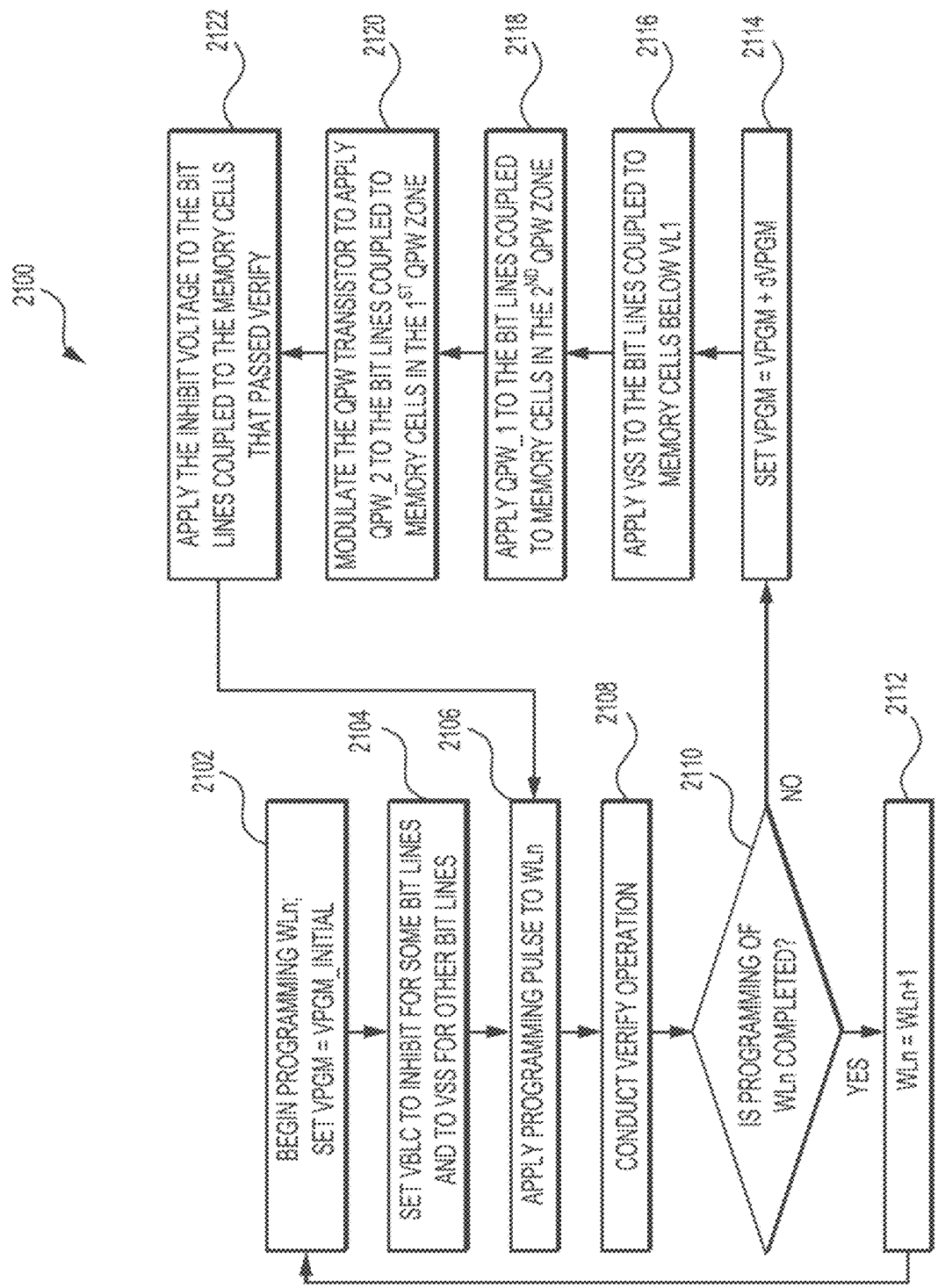
FIG. 21 is a flow chart illustrating the steps of programming the memory cells of a memory block according to the first example embodiment of the present disclosure.

Turning now to FIG. 21, a flow chart 2100 is provided that depicts the steps of programming the word lines in a memory block or sub-block according to an example embodiment of the present disclosure. The control circuitry is configured/programmed to perform these steps to program the memory cells to a plurality of data states so that each memory cell retains multiple bits of data, e.g., MLC, TLC, or QLC. At step 2102, programming of the memory cells of a selected word line WLn begins. Also at this step, the programming voltage VPGM is set to a starting or initial magnitude VPGM_initial, i.e., VPGM=VPGM_initial.

At step 2104, a first program loop begins. An inhibit voltage is applied to the bit lines that are coupled to the memory cells which are to remain in the erased Er data state. For the memory cells that are to be programmed to any of the programmed data states (for example, S1-S7 in the case of TLC or S1-S15 in the case of QLC), the QPW transistors coupled to the bit lines coupled to those memory cells are turned on to apply the VSS voltage to those bit lines.

At step 2106, the VPGM pulse is applied to the control gate of the selected word line WLn to program the non-inhibited memory cells of the selected word line. At step 2108, the verify operation is performed on the selected word line. The verify operation may include the application of a plurality of verify voltages associated with one or more programmed data states to determine the threshold voltages Vts of the memory cells in the selected word line WLn. For example, the verify operation can include a first verify low VL1 pulse, a second verify low VL2 pulse, and/or a verify high VH pulse for one or more data states to determine if programming has been completed for any of the memory cells in the selected word line and if the threshold voltages Vts of any of the memory cells in the selected word line are in either QPW zone of their intended data states.

At decision step 2110, it is determined if programming of the selected word line WLn is completed, i.e., has programming failed or have all of the memory cells in the selected word line WLn been programmed to their respective intended data states. If the answer at decision step 2110 is "yes," than at step 2112, the selected word line is advanced to a next sequential word line (for example, WLn=WLn+1 or WLn=WLn−1) in the memory block or sub-block until either all of the data is written or until the memory block or sub-block is closed. The process then returns to step 2102 to begin programming data into the memory cells of the new selected word line WLn.

If the answer at decision step 2110 is "no," then at step 2114, a next program loop begins with the voltage of the VPGM pulse being incrementally increased by the step size dVPGM, i.e., VPGM=VPGM+dVPGM.

At steps 2116-2122, the appropriate voltages (inhibit, VSS, QPW_1, or QPW_2) are applied to the bit lines depending on the threshold voltages Vts of the memory cells coupled to those bit lines to control programming speeds of the memory cells in the selected word line. These steps can all take place in parallel or in any suitable order.

At step 2116, the VSS voltage is applied to the bit lines that are coupled to each of the memory cells that have threshold voltages Vts which are below the VL1 voltages of the intended data state that they are being programmed to. For example, the bit line coupled to a memory cell being programmed to data state S2 receives the VSS voltage if its threshold voltage Vt is less than VL1_S2, the bit line coupled to a memory cell being programmed to data state S3 receives the VSS voltage if its threshold voltage Vt is less than VL1_S3, and so on. For each bit line to receive the VSS voltage, the corresponding QPW transistor is turned on so that the VSS voltage source is coupled to the bit line BL (see FIG. 16). This ensures that the memory cells which are below the VL1 voltages of their intended programmed data states are programmed at high speed during the ensuing VPGM pulse since there is little risk of overprogramming those memory cells.

At step 2118, the QPW_1 voltage is applied to the bit lines that are coupled to each of the memory cells that have threshold voltages Vts which are in the second QPW zone 1502 (see FIG. 15) for their intended data states. For example, the bit line coupled to a memory cell being programmed to data state S2 receives the QPW_1 voltage if its threshold voltage Vt is between VL2_S2 and VH_S2, the bit line coupled to a memory cell being programmed to data state S3 receives the QPW_1 voltage if its threshold voltage Vt is between VL2_S3 and VH_S3, and so on. For each bit line to receive the QPW_1 voltage, the corresponding QPW transistor is turned off so that the VBLC_QPW voltage source is coupled to the bit line BL (see FIG. 16). This dramatically slows the programming of the memory cells that are in the second QPW zone 1502 and are nearly finished with programming to avoid overprogramming those memory cells.

At step 2120, the QPW_2 voltage is applied to the bit lines that are coupled to each of the memory cells that have threshold voltages Vts which are in the first QPW zone 1500 (see FIG. 15) for their intended data states. For example, the bit line coupled to a memory cell being programmed to data state S2 receives the QPW_2 voltage if its threshold voltage Vt is between VL1_S2 and VL2_S2, the bit line coupled to a memory cell being programmed to data state S3 receives the QPW_2 voltage if its threshold voltage Vt is between VL1_S3 and VL2_S3, and so on. For each bit line to receive the QPW_2, the corresponding QPW transistor is modulated or cycled between being turned on and turned off so that the average voltage at the bit line BL is approximately QPW_2 during the application of the ensuing VPGM pulse (see FIG. 16). This slows the programming of the memory cells that are in the first QPW zone 1500 by a lesser amount than the QPW_1 voltage slows the programming of the memory cells that are in the second QPW zone 1502.

At step 2122, an inhibit voltage is applied to the bit lines that are coupled to each of the memory cells that are intended to remain in the erased data state Er or that have threshold voltages Vts which are above the verify high VH of their intended data states. For example, the bit line coupled to a memory cell being programmed to data state S2 receives the inhibit voltage if its threshold voltage Vt is greater than VH_S2, the bit line coupled to a memory cell being programmed to data state S3 receives the inhibit voltage if its threshold voltage Vt is greater than VH_S3, and so on.

The process then returns to step 2106 to apply the next subsequent VPGM pulse VPGM to the selected word line WLn. Each memory cell in the selected word line will be inhibited if its corresponding bit line voltage is the inhibit voltage; will be programmed at high speed if its corresponding bit line voltage is VSS; will be programmed at reduced speeds if its corresponding bit line voltage is QPW_2; and will be programmed at very reduced speeds if its corresponding bit line voltage is QPW_1.

Figure 22:
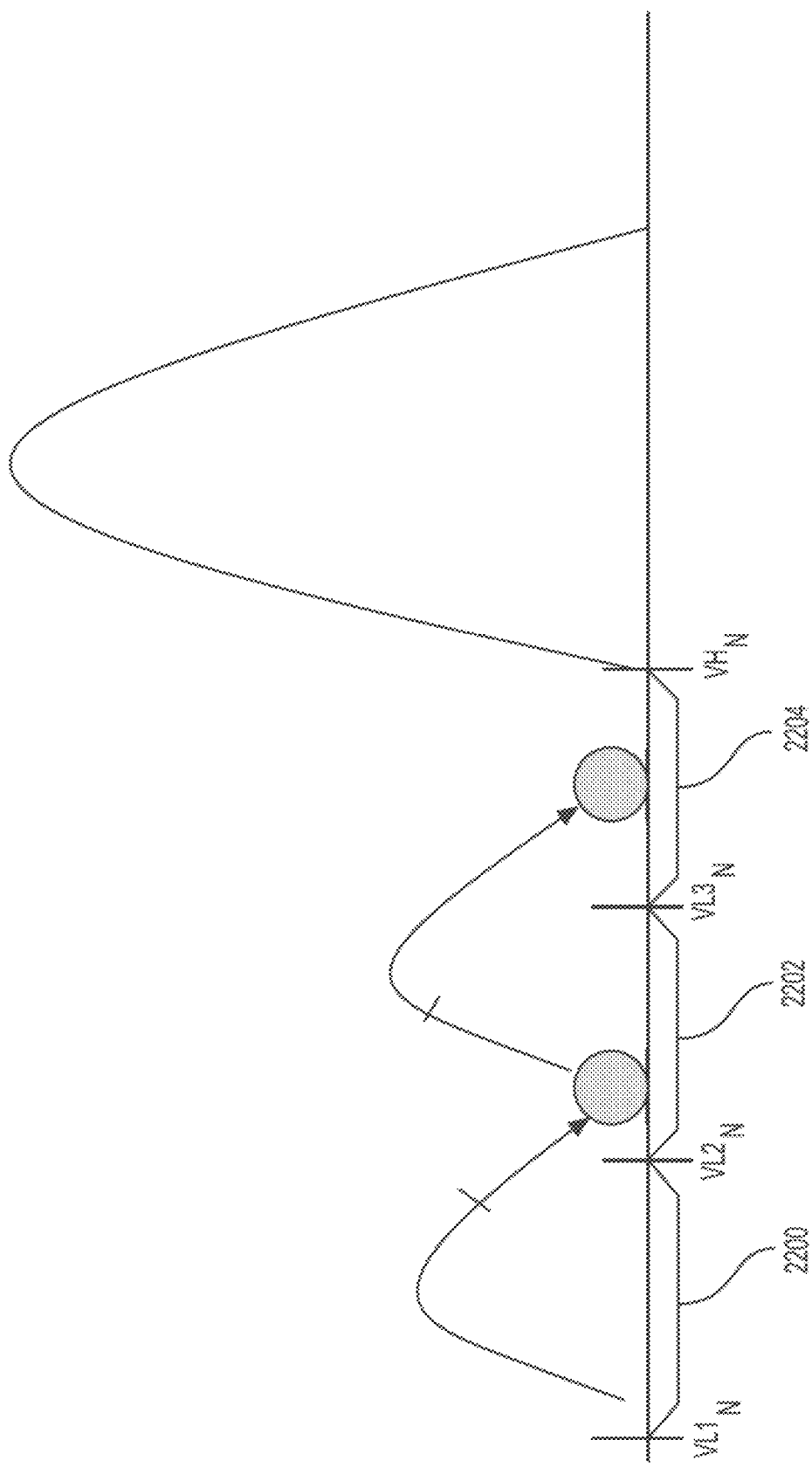
FIG. 22 is a plot of the threshold voltage of a memory cell following a plurality of program loops where there are three QPW zones.
Figure 24:
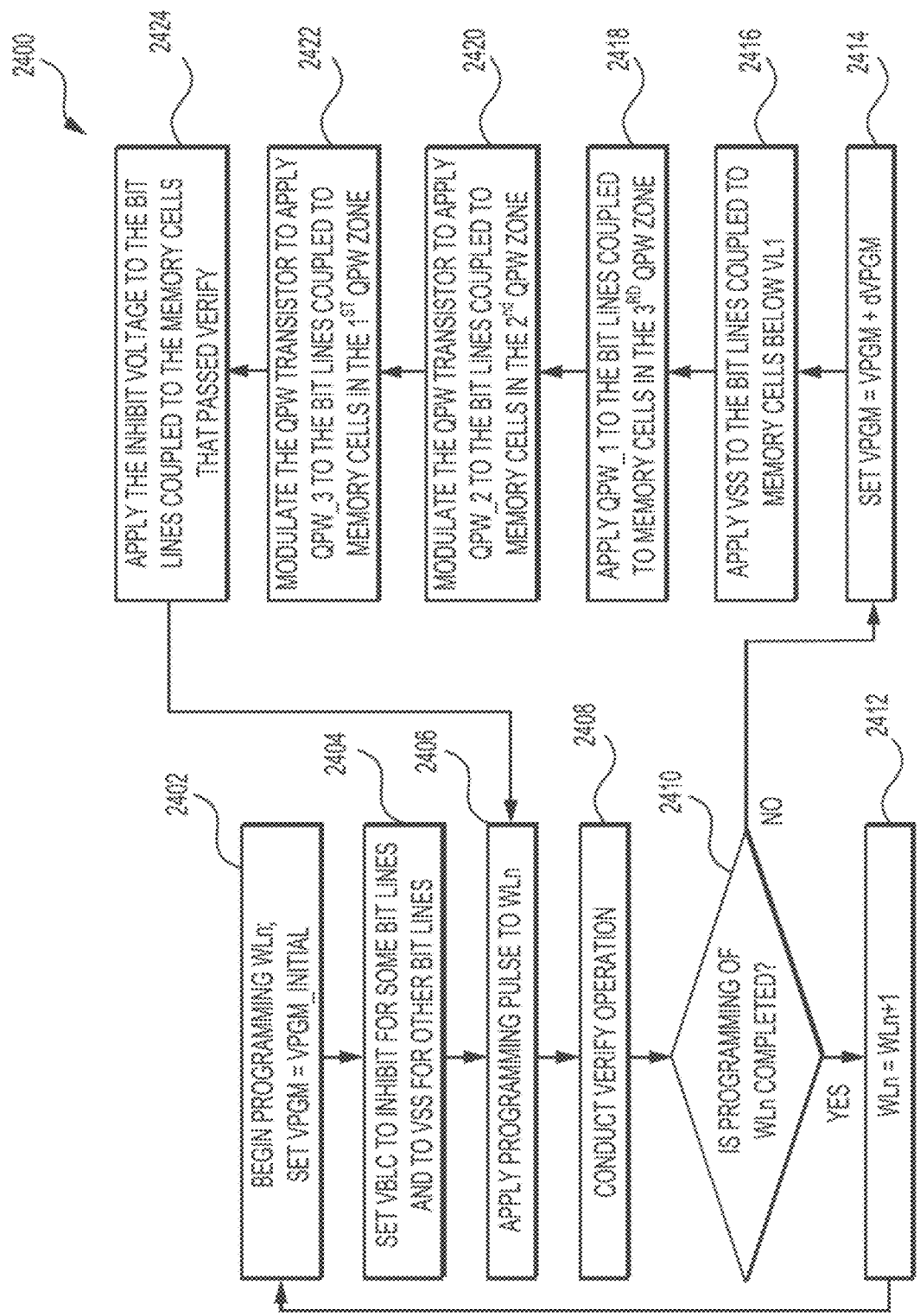
FIG. 24 is a flow chart illustrating the steps of programming the memory cells of a memory block according to the second example embodiment of the present disclosure.

FIGS. 22-24 illustrate a second exemplary embodiment of the present disclosure is illustrated. In this second embodiment, three QPW bias voltages (QPW_1, QPW_2, QPW_3) are generated with a single QPW voltage source rather than two QPW bias voltages as is the case in the first embodiment described above. As shown in FIG. 22, in this embodiment, there are three QPW zones: a first QPW zone 2200, a second QPW zone 2202, and a third QPW zone 2204. The voltage source VBLC_QPW (see the circuit diagram of FIG. 16) is set to the value of the first QPW bias voltage QPW_1. The second QPW bias voltage QPW_2 is applied to the bit line BL by modulating the QPW transistor with a first modulation pattern, and the third QPW bias voltage QPW_3 is applied to the bit line BL by modulating the QPW transistor with a second modulation pattern that is different than the first modulation pattern. QPW_3 is set to a voltage that is less than QPW_2 by increasing the amount of time that the QPW transistor is off relative to the time that the QPW transistor is on within each cycle. For example, the first modulation pattern to generate QPW_2 could be the modulation pattern of FIGS. 18A and 18B, and the second modulation pattern to generate QPW_3 could be the modulation pattern of FIGS. 19A and 19B.

As set forth in the table of FIG. 23, the control circuitry is configured to automatically apply the VSS voltage or any of the three QPW voltages QPW_1, QPW_2, QPW_3 to the bit line BL using two data latches TDLa, TDLb. In this example, if TDLa is "0," then the status of the QPW transistor is the inversion of TDLb. That is, if TDLa is "0," and TDLb is "0," then the QPW transistor is turned on to supply the VSS voltage to the bit line. If TDLa is "0" and TDLb is "1," then the QPW transistor is turned off to supply the QPW_1 voltage from the VBLC_QPW voltage source to the bit line.

If TDLa is "1," then the QPW transistor is modulated to supply either the QPW_2 bias voltage or the QPW_3 bias voltage to the bit line. For example, if TDLa is "1" and TDLb is "0," then the QPW transistor is modulated between being turned off for "m" clocks and then on for "n" clocks to supply the QPW_2 bias voltage to the bit line. If TDLb is "1" and TDLb is "1," then the QPW transistor is modulated between being turned off for "j" clocks and being turned on for "k" clocks to supply the QPW_3 bias voltage to the bit line. The variables m, n, j, and k can be selected to provide the desired QPW_2 and QPW_3 voltages with QPW_3 being less than QPW_2 and with QPW_2 being less than QPW_1. This is but one example logic that can be applied and other suitable patterns could be employed.

Turning now to FIG. 24, a flow chart 2400 is provided that depicts the steps of programming the word lines in a memory block or sub-block according to an example embodiment of the present disclosure. The control circuitry is configured/programmed to perform these steps to program the memory cells to multiple programmed data states such that each memory cell retains multiple bits of data, e.g., MLC, TLC, or QLC. At step 2402, programming of the memory cells of a selected word line WLn begins. Also at this step, the programming voltage VPGM is set to a starting or initial magnitude VPGM_initial, i.e., VPGM=VPGM_initial.

At step 2404, a first program loop begins. An inhibit voltage is applied to the bit lines that are coupled to the memory cells which are to remain in the erased Er data state. For the memory cells that are to be programmed to any of the programmed data states (for example, S1-S7 in the case of TLC or S1-S15 in the case of QLC), the QPW transistors coupled to the bit lines coupled to those memory cells are turned on to apply the VSS voltage to those bit lines.

At step 2406, the VPGM pulse is applied to the control gate of the selected word line WLn to program the non-inhibited memory cells of the selected word line. At step 2408, the verify operation is performed on the selected word line. The verify operation may include the application of a plurality of verify voltages associated with one or more programmed data states to determine the threshold voltages Vts of the memory cells in the selected word line WLn. For example, the verify operation can include a first verify low VL1 pulse, a second verify low VL2 pulse, a third verify low VL3 pulse, and a verify high VH pulse for one or more data states. Thus, during the verify operation, it is determined if a plurality of the memory cells in the selected word line have completed programming to their intended data states or have threshold voltages Vts that fall into any of the first, second, and third QPW zones 2200, 2202, 2204 for their intended data states.

At decision step 2410, it is determined if programming of the selected word line WLn is completed, i.e., has programming failed or have all of the memory cells in the selected word line WLn been programmed to their respective intended data states. If the answer at decision step 2410 is "yes," than at step 2412, the selected word line is advanced to a next sequential word line (for example, WLn=WLn+1 or WLn=WLn−1) in the memory block or sub-block until either all of the data is written or the memory block or sub-block is closed. The process then returns to step 2402 to begin programming data into the memory cells of the new selected word line WLn.

If the answer at decision step 2410 is "no," then at step 2414, a next program loop begins with the voltage of the VPGM pulse being incrementally increased by the step size dVPGM, i.e., VPGM=VPGM+dVPGM.

At steps 2416-2424, the appropriate voltages (inhibit, VSS, QPW_1, QPW_2, or QPW_3) are applied to the bit lines depending on the threshold voltages Vts of the memory cells coupled to those bit lines to control programming speeds in the memory cells of the selected word line. Any combination of these steps 2416-2424 can be performed in parallel with one another, and these steps can be performed in any suitable order.

At step 2416, the VSS voltage is applied to the bit lines that are coupled to each of the memory cells that have threshold voltages Vts which are below the VL1 voltages of the intended data states that they are being programmed to. For example, the bit line coupled to a memory cell being programmed to data state S2 receives the VSS voltage if its threshold voltage Vt is less than VL1_S2, the bit line coupled to a memory cell being programmed to data state S3 receives the VSS voltage if its threshold voltage Vt is less than VL1_S3, and so on. For each bit line to receive the VSS voltage, the corresponding QPW transistor is turned on so that the VSS voltage source is coupled to the bit line BL (see FIG. 16). This ensures that the memory cells which are below the VL1 voltages of their intended programmed data states are programmed at high speed during the ensuing VPGM pulse since there is little risk of overprogramming these memory cells.

At step 2418, the QPW_1 voltage is applied to the bit lines that are coupled to each of the memory cells that have threshold voltages Vts which are in the third QPW zone 2204 (see FIG. 22) for their intended data states. For example, the bit line coupled to a memory cell being programmed to data state S2 receives the QPW_1 voltage if its threshold voltage Vt is between VL3_S2 and VH_S2, the bit line coupled to a memory cell being programmed to data state S3 receives the QPW_1 voltage if its threshold voltage Vt is between VL3_S and VH_S3, and so on. For each bit line to receive the QPW_1 voltage, the corresponding QPW transistor is turned off so that the VBLC_QPW voltage source is coupled to the bit line BL (see FIG. 16). This dramatically slows the programming of the memory cells that are in the third QPW zone 1502 and are nearly finished with programming to avoid overprogramming these memory cells.

At step 2420, the QPW_2 voltage is applied to the bit lines that are coupled to each of the memory cells that have threshold voltages Vts which are in the second QPW zone 2202 (see FIG. 22) for their intended data states. For example, the bit line coupled to a memory cell being programmed to data state S2 receives the QPW_2 voltage if its threshold voltage Vt is between VL2_S2 and VL3_S2, the bit line coupled to a memory cell being programmed to data state S3 receives the QPW_2 voltage if its threshold voltage Vt is between VL2_S3 and VL3_S3, and so on. For each bit line to receive the QPW_2, the corresponding QPW transistor is modulated or cycled between being turned on and being turned off so that the average voltage at the bit line BL is approximately QPW_2 during the application of the ensuing VPGM pulse (see FIG. 16). This slows the programming of the memory cells that are in the second QPW zone 2202 by a lesser amount than the QPW_1 voltage slows the programming of the memory cells that are in the third QPW zone 2204 to avoid overprogramming these memory cells.

At step 2422, the QPW_3 voltage is applied to the bit lines that are coupled to each of the memory cells that have threshold voltages Vts which are in the first QPW zone 2200 (see FIG. 22) for their intended data states. For example, the bit line coupled to a memory cell being programmed to data state S2 receives the QPW_3 voltage if its threshold voltage Vt is between VL1_S2 and VL2_S2, the bit line coupled to a memory cell being programmed to data state S3 receives the QPW_3 voltage if its threshold voltage Vt is between VL1_S3 and VL2_S3, and so on. For each bit line to receive the QPW_3, the corresponding QPW transistor is modulated or cycled between being turned on and being turned off so that the average voltage at the bit line BL is approximately QPW_3 during the application of the ensuing VPGM pulse (see FIG. 16). This slows the programming of the memory cells that are in the first QPW zone 2200 by a lesser amount than the QPW_2 voltage slows the programming of the memory cells that are in the second QPW zone 2202.

At step 2424, an inhibit voltage is applied to the bit lines that are coupled to each of the memory cells that are intended to remain in the erased data state Er or that have threshold voltages Vts which are above the verify high VH of their intended data states. For example, the bit line coupled to a memory cell being programmed to data state S2 receives the inhibit voltage if its threshold voltage Vt is greater than VH_S2, the bit line coupled to a memory cell being programmed to data state S3 receives the inhibit voltage if its threshold voltage Vt is greater than VH_S3, and so on.

The process then returns to step 2406 to apply the next subsequent VPGM pulse to the selected word line WLn. Each memory cell in the selected word line will be inhibited if its corresponding bit line voltage is the inhibit voltage; will be programmed at high speed if its corresponding bit line voltage is VSS; will be programmed at reduced speeds if its corresponding bit line voltage is QPW_3; will be programmed at more reduced speeds if its corresponding bit line voltage is QPW_2; and will be programmed at even more reduced speeds if its corresponding bit line voltage is QPW_1.

Figure 25:
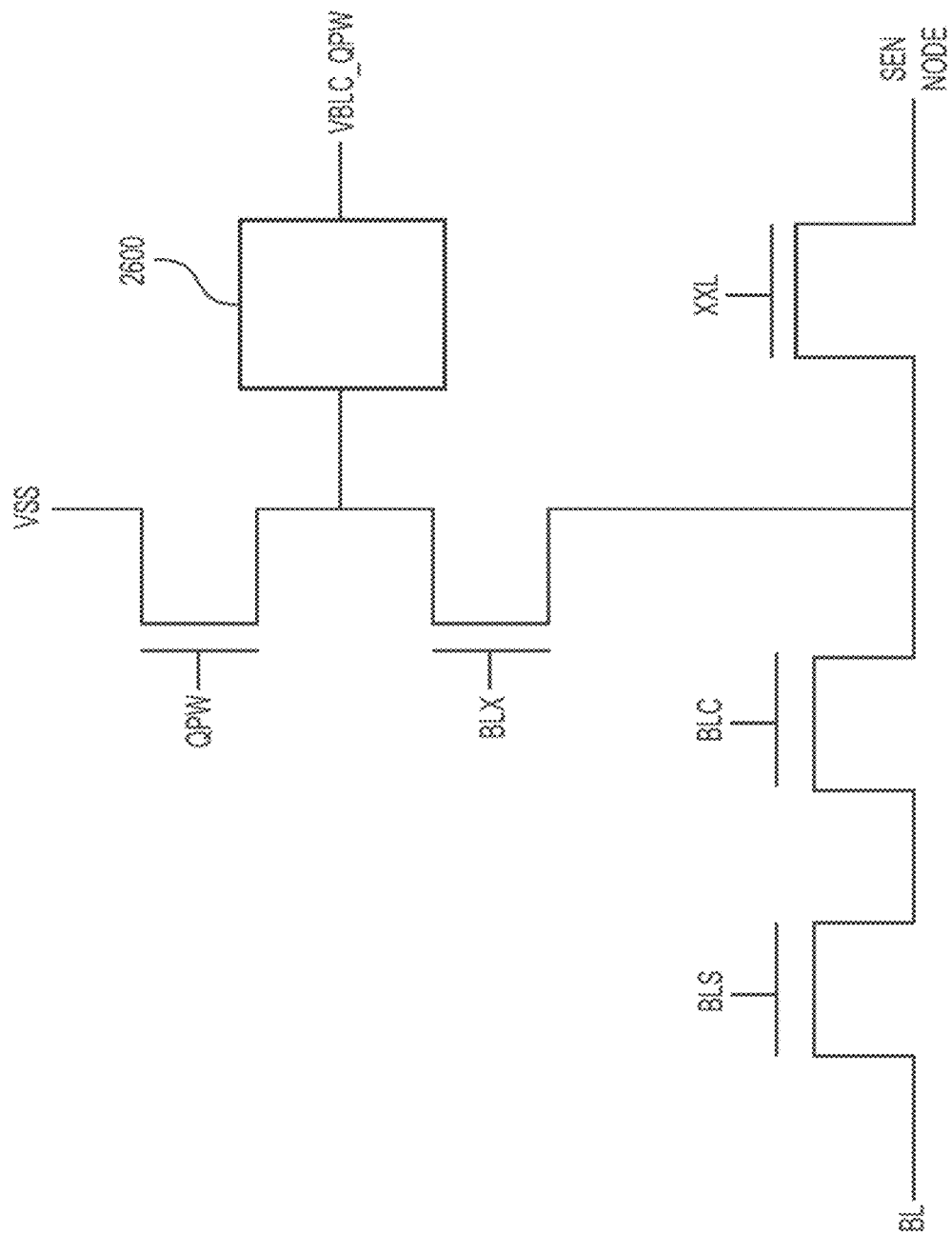
FIG. 25 is an example circuit diagram illustrating a VSS voltage source, a QPW voltage source, a bit line, and a schematic circuit connecting the QPW voltage source to the bit line.
Figure 26:
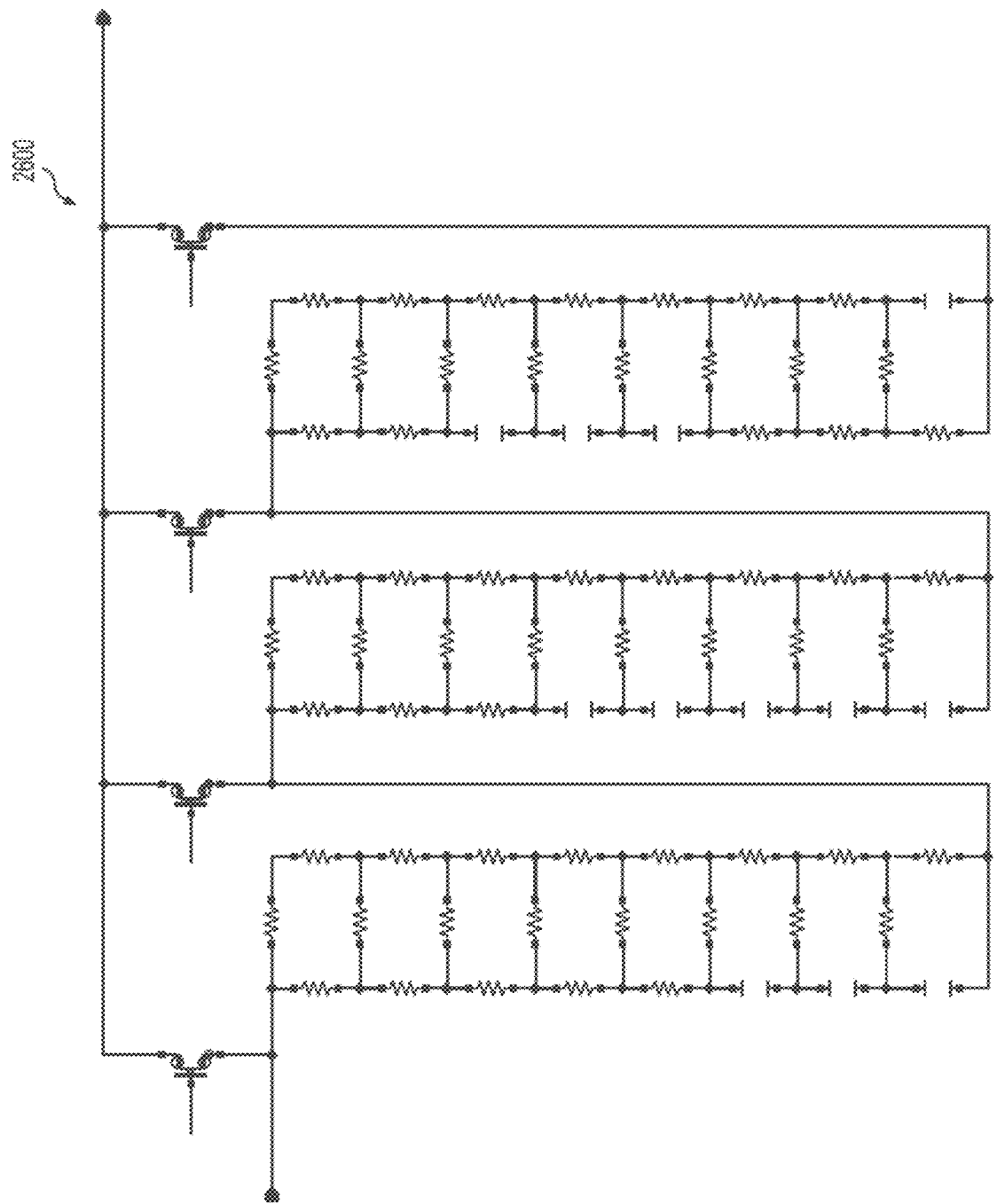
FIG. 26 is an example circuit diagram capable of reducing a ramp rate of the voltage supplied by the QPW voltage source of FIG. 25 to the bit line of FIG. 25.
Figure 27:
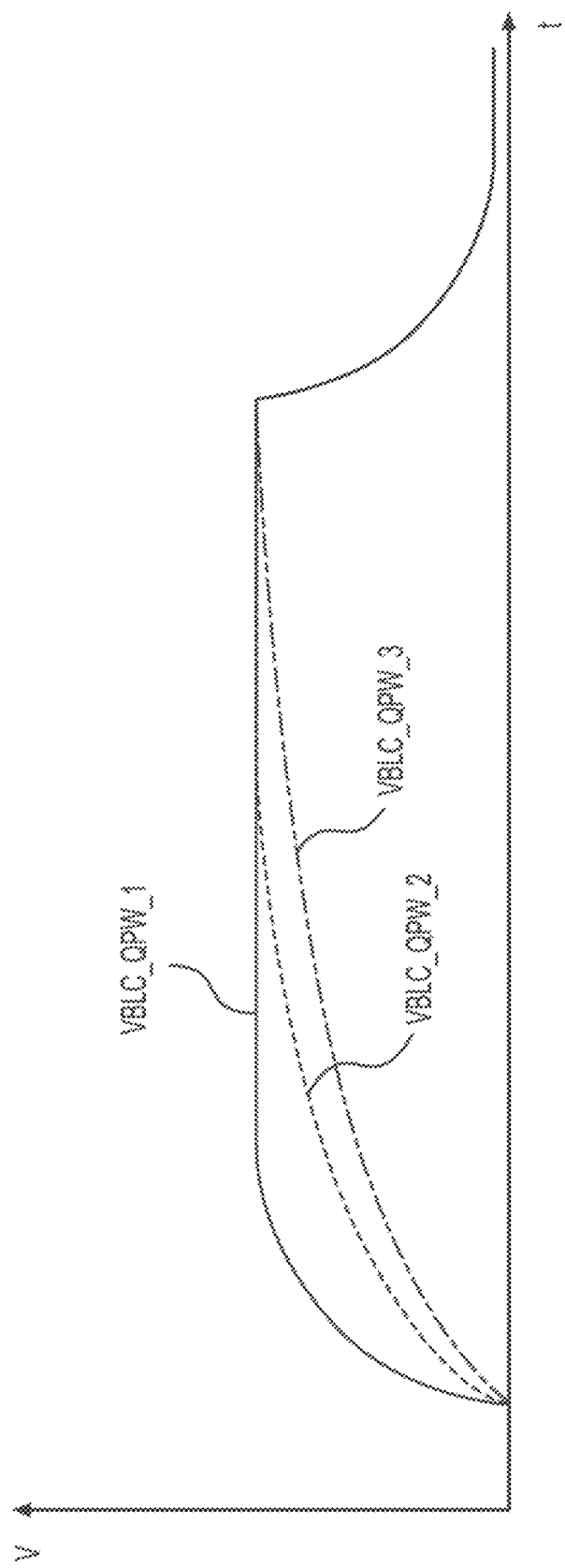
FIG. 27 is a plot of voltage received at the bit line over time where the ramp rate of the voltage is set at different levels by the circuit of FIG. 26.

Turning now to FIGS. 25-27, according to another exemplary embodiment, rather than generating different target QPW voltages, a single QPW source VBLC_QPW can be manipulated by a circuit 2600 to slow programming by ramping the voltage that is applied to a bit line at different rates. As illustrated in FIG. 27, the circuitry allows the bit line bias to selectively ramp at a quick first rate (VBLC_QPW_1) to greatly slow programming of a memory cell coupled to the bit line, ramp at a slower second rate (VBLC_QPW_2) to moderately slow programming of the memory cell, or ramp at a still slower third rate (VBLC_QPW_3) to slightly slow programming of the memory cell.

FIG. 26 illustrates an example circuit 2600 that can be used to select the ramp rate of the bit line bias from the single QPW voltage source. In this example, there are four transistors 2602, 2604, 2606, 2608 that can individually be turned on or off. If the first transistor 2602 is turned on, then the voltage from the source VBLC_QPW will be supplied directly through the circuit 2600 and towards the bit line. If the first transistor 2602 is turned off, then the other transistors 2604, 2606, 2608 can be either turned on or off to either include or exclude certain ones of a plurality of resistors and capacitors in the electrical path between the source VBLC_QPW and the bit line. The transistors 2604 connect different paths that extend in parallel with one another and are each configured to ramp the voltage that is supplied from the source VBLC_QPW to the bit line at different rates. Each of these paths includes at least one resistor, and/or at least one capacitor to alter the ramp rate of the voltage supplied by the source VBLC_QPW. By manipulating the transistors 2604, 2606, 2608 to include or exclude certain of the parallel paths, the ramp rate of the voltage received at the bit line can be controlled from the baseline to adjust the programming speed of the memory cell coupled to the bit line, i.e., a slower ramp rate will result in quicker programming of the memory cell coupled to the bit line.

Various terms are used herein to refer to particular system components. Different companies may refer to a same or similar component by different names and this description does not intend to distinguish between components that differ in name but not in function. To the extent that various functional units described in the following disclosure are referred to as "modules," such a characterization is intended to not unduly restrict the range of potential implementation mechanisms. For example, a "module" could be implemented as a hardware circuit that includes customized very-large-scale integration (VLSI) circuits or gate arrays, or off-the-shelf semiconductors that include logic chips, transistors, or other discrete components. In a further example, a module may also be implemented in a programmable hardware device such as a field programmable gate array (FPGA), programmable array logic, a programmable logic device, or the like. Furthermore, a module may also, at least in part, be implemented by software executed by various types of processors. For example, a module may comprise a segment of executable code constituting one or more physical or logical blocks of computer instructions that translate into an object, process, or function. Also, it is not required that the executable portions of such a module be physically located together, but rather, may comprise disparate instructions that are stored in different locations and which, when executed together, comprise the identified module and achieve the stated purpose of that module. The executable code may comprise just a single instruction or a set of multiple instructions, as well as be distributed over different code segments, or among different programs, or across several memory devices, etc. In a software, or partial software, module implementation, the software portions may be stored on one or more computer-readable and/or executable storage media that include, but are not limited to, an electronic, magnetic, optical, electromagnetic, infrared, or semiconductor-based system, apparatus, or device, or any suitable combination thereof. In general, for purposes of the present disclosure, a computer-readable and/or executable storage medium may be comprised of any tangible and/or non-transitory medium that is capable of containing and/or storing a program for use by or in connection with an instruction execution system, apparatus, processor, or device.

Similarly, for the purposes of the present disclosure, the term "component" may be comprised of any tangible, physical, and non-transitory device. For example, a component may be in the form of a hardware logic circuit that is comprised of customized VLSI circuits, gate arrays, or other integrated circuits, or is comprised of off-the-shelf semiconductors that include logic chips, transistors, or other discrete components, or any other suitable mechanical and/or electronic devices. In addition, a component could also be implemented in programmable hardware devices such as field programmable gate arrays (FPGA), programmable array logic, programmable logic devices, etc. Furthermore, a component may be comprised of one or more silicon-based integrated circuit devices, such as chips, die, die planes, and packages, or other discrete electrical devices, in an electrical communication configuration with one or more other components via electrical conductors of, for example, a printed circuit board (PCB) or the like. Accordingly, a module, as defined above, may in certain embodiments, be embodied by or implemented as a component and, in some instances, the terms module and component may be used interchangeably.

Where the term "circuit" is used herein, it includes one or more electrical and/or electronic components that constitute one or more conductive pathways that allow for electrical current to flow. A circuit may be in the form of a closed-loop configuration or an open-loop configuration. In a closed-loop configuration, the circuit components may provide a return pathway for the electrical current. By contrast, in an open-looped configuration, the circuit components therein may still be regarded as forming a circuit despite not including a return pathway for the electrical current. For example, an integrated circuit is referred to as a circuit irrespective of whether the integrated circuit is coupled to ground (as a return pathway for the electrical current) or not. In certain exemplary embodiments, a circuit may comprise a set of integrated circuits, a sole integrated circuit, or a portion of an integrated circuit. For example, a circuit may include customized VLSI circuits, gate arrays, logic circuits, and/or other forms of integrated circuits, as well as may include off-the-shelf semiconductors such as logic chips, transistors, or other discrete devices. In a further example, a circuit may comprise one or more silicon-based integrated circuit devices, such as chips, die, die planes, and packages, or other discrete electrical devices, in an electrical communication configuration with one or more other components via electrical conductors of, for example, a printed circuit board (PCB). A circuit could also be implemented as a synthesized circuit with respect to a programmable hardware device such as a field programmable gate array (FPGA), programmable array logic, and/or programmable logic devices, etc. In other exemplary embodiments, a circuit may comprise a network of non-integrated electrical and/or electronic components (with or without integrated circuit devices). Accordingly, a module, as defined above, may in certain embodiments, be embodied by or implemented as a circuit.

It will be appreciated that example embodiments that are disclosed herein may be comprised of one or more microprocessors and particular stored computer program instructions that control the one or more microprocessors to implement, in conjunction with certain non-processor circuits and other elements, some, most, or all of the functions disclosed herein. Alternatively, some or all functions could be implemented by a state machine that has no stored program instructions, or in one or more application-specific integrated circuits (ASICs) or field-programmable gate arrays (FPGAs), in which each function or some combinations of certain of the functions are implemented as custom logic. A combination of these approaches may also be used. Further, references below to a "controller" shall be defined as comprising individual circuit components, an application-specific integrated circuit (ASIC), a microcontroller with controlling software, a digital signal processor (DSP), a field programmable gate array (FPGA), and/or a processor with controlling software, or combinations thereof.

Additionally, the terms "couple," "coupled," or "couples," where may be used herein, are intended to mean either a direct or an indirect connection. Thus, if a first device couples, or is coupled to, a second device, that connection may be by way of a direct connection or through an indirect connection via other devices (or components) and connections.

Regarding, the use herein of terms such as "an embodiment," "one embodiment," an "exemplary embodiment," a "particular embodiment," or other similar terminology, these terms are intended to indicate that a specific feature, structure, function, operation, or characteristic described in connection with the embodiment is found in at least one embodiment of the present disclosure. Therefore, the appearances of phrases such as "in one embodiment," "in an embodiment," "in an exemplary embodiment," etc., may, but do not necessarily, all refer to the same embodiment, but rather, mean "one or more but not all embodiments" unless expressly specified otherwise. Further, the terms "comprising," "having," "including," and variations thereof, are used in an open-ended manner and, therefore, should be interpreted to mean "including, but not limited to . . . " unless expressly specified otherwise. Also, an element that is preceded by "comprises . . . a" does not, without more constraints, preclude the existence of additional identical elements in the subject process, method, system, article, or apparatus that includes the element.

The terms "a," "an," and "the" also refer to "one or more" unless expressly specified otherwise. In addition, the phrase "at least one of A and B" as may be used herein and/or in the following claims, whereby A and B are variables indicating a particular object or attribute, indicates a choice of A or B, or both A and B, similar to the phrase "and/or." Where more than two variables are present in such a phrase, this phrase is hereby defined as including only one of the variables, any one of the variables, any combination (or sub-combination) of any of the variables, and all of the variables.

Further, where used herein, the term "about" or "approximately" applies to all numeric values, whether or not explicitly indicated. These terms generally refer to a range of numeric values that one of skill in the art would consider equivalent to the recited values (e.g., having the same function or result). In certain instances, these terms may include numeric values that are rounded to the nearest significant figure.

In addition, any enumerated listing of items that is set forth herein does not imply that any or all of the items listed are mutually exclusive and/or mutually inclusive of one another, unless expressly specified otherwise. Further, the term "set," as used herein, shall be interpreted to mean "one or more," and in the case of "sets," shall be interpreted to mean multiples of (or a plurality of) "one or more," "ones or more," and/or "ones or mores" according to set theory, unless expressly specified otherwise.

The foregoing detailed description has been presented for purposes of illustration and description. It is not intended to be exhaustive or be limited to the precise form disclosed. Many modifications and variations are possible in light of the above description. The described embodiments were chosen to best explain the principles of the technology and its practical application to thereby enable others skilled in the art to best utilize the technology in various embodiments and with various modifications as are suited to the particular use contemplated. The scope of the technology is defined by the claims appended hereto.

What is claimed is:

1. A method of programming a memory device, comprising the steps of:
preparing a memory block that includes a plurality of memory cells that are in electrical communication with respective bit lines and are arranged in a plurality of word lines and that includes a quick pass write (QPW) voltage source and at least one transistor that is configured to control the supply of a first QPW bias voltage from the QPW voltage source to the bit lines;
programming the memory cells of a selected word line of the plurality of word lines to a plurality of data states in a plurality of program loops, the program loops including for each memory cell in the selected word line:
determining if the memory cell has a threshold voltage that is within a first QPW zone or is within a second QPW zone;
in response to a determination that the memory cell is in the second QPW zone, connecting the QPW voltage source to the bit line that is in communication with that memory cell to supply the first QPW bias voltage to the bit line, and
in response to a determination that the memory cell is in the first QPW zone, controlling the at least one transistor to supply an average second QPW bias voltage to the bit line, the second QPW bias voltage being less than the first QPW bias voltage.

2. The method as set forth in claim 1, wherein each program loop further includes the step of applying a programming pulse to the selected word line.

3. The method as set forth in claim 2, wherein the at least one transistor includes a QPW transistor and wherein controlling the at least one transistor to supply the average second QPW bias voltage to the bit line includes modulating the QPW transistor.

4. The method as set forth in claim 3, wherein the program loops further include, for each memory cell in the selected word line, the step of:
in response to a determination that the memory cell has a threshold voltage that is less than the first QPW zone, applying a very low VSS voltage to the bit line.

5. The method as set forth in claim 3, wherein the program loops further include, for each memory cell in the selected word line, the step of:
in response to a determination that the memory cell has a threshold voltage that is above the second QPW zone, applying an inhibit voltage to the bit line.

6. The method as set forth in claim 3, wherein the step of determining if the memory cell has a threshold voltage that is within the first QPW zone or is within the second QPW zone further includes determining if the memory cell has a threshold voltage that is within a third QPW zone that is different than the first and second QPW zones, and wherein the program loops further include, for each memory cell in the selected word line, the step of:
in response to a determination that the memory cell has a threshold voltage that is in the third QPW zone, modulating the QPW transistor in a manner that supplies an average third QPW bias voltage to the bit line, the average third QPW voltage being different than the average second QPW bias voltage.

7. The method as set forth in claim 3, wherein the memory block further includes a VSS voltage source that supplies a VSS voltage that is less than the first QPW bias voltage, and wherein the QPW transistor is located electrically between the VSS voltage source and one of the bit lines.

8. The method as set forth in claim 3, wherein between program loops, a programming voltage of the programming pulse is increased.

9. A memory device, comprising:
a memory block including a plurality of memory cells that are in electrical communication with respective bit lines and are arranged in a plurality of word lines and including a quick pass write (QPW) voltage source and at least one transistor that can control the supply of a first QPW bias voltage from the QPW voltage source to the bit lines;
control circuitry that is configured to program the memory cells of a selected word line of the plurality of word lines to a plurality of data states in a plurality of program loops, for each memory cell in the selected word line, the control circuitry being configured to:
determine if the memory cell has a threshold voltage that is within a first QPW zone or is within a second QPW zone;
in response to a determination that the memory cell is in the second QPW zone, connect the QPW voltage source to the bit line that is in communication with that memory cell to supply the first QPW bias voltage to the bit line, and
in response to a determination that the memory cell is in the first QPW zone, control the at least one transistor to supply an average second QPW bias voltage to the bit line, and wherein the second QPW bias voltage is less than the first QPW bias voltage.

10. The memory device as set forth in claim 9, wherein during each program loop, the control circuitry is further configured to apply a programming pulse to the selected word line.

11. The memory device as set forth in claim 10, wherein the at least one transistor includes a QPW transistor and wherein the control circuitry is configured to modulate the QPW transistor to supply the average second QPW bias voltage to the bit line.

12. The memory device as set forth in claim 11, wherein during each of the program loops, for each memory cell of the selected word line, the control circuitry is further configured to:
in response to a determination that the memory cell has a threshold voltage that is less than the first QPW zone, apply a very low VSS voltage to the bit line.

13. The memory device as set forth in claim 11, wherein during each of the program loops, for each memory cell in the selected word line, the control circuitry is further configured to:
in response to a determination that the memory cell has a threshold voltage that is above the second QPW zone, apply an inhibit voltage to the bit line.

14. The memory device as set forth in claim 11, wherein for each memory cell of the selected word line, the control circuitry is further configured to determine if the memory cell has a threshold voltage that is within a third QPW zone that is different than the first and second QPW zones, and during each of the program loops, for each memory cell in the selected word line, the control circuitry is further configured to:
in response to a determination that the memory cell has a threshold voltage that is in the third QPW zone, modulate the QPW transistor in a manner that supplies an average third QPW bias voltage to the bit line, the average third QPW voltage being different than the average second QPW bias voltage.

15. The memory device as set forth in claim 11, wherein the memory block further includes a VSS voltage source that supplies a VSS voltage that is less than the first QPW bias voltage, and
wherein the QPW transistor is located electrically between the VSS voltage source and one of the bit lines.

16. The memory device as set forth in claim 11, wherein between program loops, the control circuitry is configured to increase a programming voltage of the programming pulse.

17. An apparatus, comprising:
a memory block including a plurality of memory cells that are in electrical communication with respective bit lines and are arranged in a plurality of word lines and including a quick pass write (QPW) voltage source and a QPW transistor that can control the supply of a first QPW bias voltage from the QPW voltage source to the bit lines;
a programming means for programming the memory cells of the plurality of word lines, during programming of the memory cells of a selected word line of the plurality of word lines, the programming means being configured to:
determine if a selected memory cell of the selected word line has a threshold voltage that is below a first QPW zone, within the first QPW zone, within a second QPW zone, or above the second QPW zone,
in response to a determination that the selected memory cell has a threshold voltage that is below the first QPW zone, apply a VSS voltage to the bit line that is in communication with the selected memory cell,
in response to a determination that the selected memory cell has a threshold voltage that is in the first QPW zone, modulate the QPW transistor to apply a second QPW bias voltage to the bit line that is in communication with the selected memory cell;
in response to a determination that the selected memory cell has a threshold voltage that is in the second QPW zone, apply the first QPW bias voltage to the bit line that is in communication with the selected memory cell;
in response to a determination that the selected memory cell has a threshold voltage that is above the second QPW zone, apply an inhibit voltage to the bit line that is in communication with the selected memory cell.

18. The apparatus as set forth in claim 17, wherein during each program loop, the programming means is further configured to apply a programming pulse to the selected word line.

19. The apparatus as set forth in claim 18, wherein the memory block further includes a VSS voltage source that supplies the VSS voltage, and
wherein the QPW transistor is located electrically between the VSS voltage source and one of the bit lines.

20. The apparatus as set forth in claim 17, wherein between program loops, the programming means is configured to increase a programming voltage of the programming pulse.

* * * * *